US011912924B2

(12) United States Patent
Ahn et al.

(10) Patent No.: US 11,912,924 B2
(45) Date of Patent: Feb. 27, 2024

(54) COMPOSITION FOR ANTIFREEZING

(71) Applicant: Korea University Research and Business Foundation, Seoul (KR)

(72) Inventors: Dong June Ahn, Seoul (KR); Sang Yup Lee, Seoul (KR); Yong Ho Cho, Seoul (KR)

(73) Assignee: Korea University Research and Business Foundation, Seoul (KR)

(*) Notice: Subject to any disclaimer, the term of this patent is extended or adjusted under 35 U.S.C. 154(b) by 51 days.

(21) Appl. No.: 16/702,245

(22) Filed: Dec. 3, 2019

(65) Prior Publication Data

US 2021/0155495 A1    May 27, 2021

(30) Foreign Application Priority Data

Nov. 27, 2019 (KR) .................. 10-2019-0154268

(51) Int. Cl.
| A01N 1/02 | (2006.01) |
| C09K 5/20 | (2006.01) |
| A23L 3/37 | (2006.01) |
| C01G 7/00 | (2006.01) |
| C09K 3/18 | (2006.01) |
| B22F 1/054 | (2022.01) |

(52) U.S. Cl.
CPC .......... *C09K 5/20* (2013.01); *A01N 1/0221* (2013.01); *A01N 1/0284* (2013.01); *A23L 3/37* (2013.01); *C01G 7/00* (2013.01); *C09K 3/18* (2013.01); *B22F 1/0553* (2022.01); *C01P 2004/12* (2013.01); *C01P 2004/41* (2013.01); *C01P 2004/64* (2013.01)

(58) Field of Classification Search
None
See application file for complete search history.

(56) References Cited

U.S. PATENT DOCUMENTS

2019/0116783 A1    4/2019  Bischof et al.

FOREIGN PATENT DOCUMENTS

| JP | 2015-501140 A | | 1/2015 | |
| KR | 10-1681973 B1 | | 12/2016 | |
| KR | 10-2018-0107887 A | | 10/2018 | |
| WO | WO 2017/184721 | * | 10/2017 | ............. A01N 1/02 |
| WO | 2018174325 A1 | | 9/2018 | |
| WO | WO 2020/023222 | * | 1/2020 | ...... B01L 2200/0652 |

OTHER PUBLICATIONS

Xie et al., Scientific Reports 7:3827, pp. 1-9, published online Jun. 19, 2017 (Year: 2017).*
Khosla et al., ACS Nano, Jul. 2017, pp. A-J (Year: 2017).*
Crowhurst et al., Basic Audio, Horn Shapes, 3 pages, retrieved from the internet:http://www.vias.org/crowhurstba/crowhurst_basic_audio_vol1_049.html (Year: 2022).*
Chegg.com, Homework-help, Figure 4.3 A Saddle Shape With Negative Curvature, 2 pages, retrieved from the internet:https://www.chegg.com/homework-help/questions-and-answers/figure-43-saddle-shape-negative-curvature-412-use-physical-saddle-shaped-surface-figure-43-q74271720 (Year: 2022).*
Holloman et al., The Saddle Surface, pp. 1-8, retrieved from the internet:https://hollomanma.github.io/saddle-surface%20(2).pdf (Year: 2022).*
Jia et al., Faculty.sites.iastate.edu, Curvature, Sep. 29, 2020, pp. 1-7, retrieved from the internet: https://faculty.sites.iastate.edu/jia/files/inline-files/curvature.pdf (Year: 2020).*
Krajczewski et al., RSC Advances, 2019, 9, 18609-18618 (Year: 2019).*
Trendhunter, Horn-Shaped Speakers, 3 pages, retrieved from the internet:https://www.trendhunter.com/trends/arkcanary-ii (Year: 2011).*
Personick et al., "Making Sense of the Mayhem behind Shape Control in the Synthesis of Gold Nanoparticles", in the Journal of the American Chemical Society, 2013, vol. 135, pp. 18238-18247 (10 pages total).
Communication dated Jul. 24, 2020, from the European Patent Office in European Application No. 19212407.1.
Communication dated Jan. 21, 2021, from the Korean Patent Office in Korean Application No. 10-2019-0154268.
Jian Zhang et al., "Concave Cubic Gold Nanocrystals with High-Index Facets", J. Am. Chem. Soc., vol. 132, No. 40, pp. 14012-14014, (Sep. 20, 2010).
Khosla et al., "Characterization of Laser Gold Nanowarming: A Platform for Millimeter-Scale Cryopreservation", Langmuir, vol. 35, pp. 7364-7375, 2019 (12 pages total).
Wilkins et al., "Site-specific conjugation of antifreeze proteins onto polymer-stabilized nanoparticles", Polymer Chemistry, vol. 10, No. 23, Jun. 21, 2019, pp. 1-8 (11 pages total).
Office Action dated May 10, 2022 from the Japanese Patent Office in JP Application No. 2019-219063.

* cited by examiner

*Primary Examiner* — Evelyn Y Pyla
(74) *Attorney, Agent, or Firm* — Sughrue Mion, PLLC

(57) ABSTRACT

The present invention provides a composition for antifreezing including a gold (Au) nanostructure in which at least a portion thereof is concave, thereby it is possible to increase a survival rate of cells due to having excellent effect of inhibiting ice recrystallization when cryopreservation of the cells, and maintain a texture of food even when using in the freezing of food.

17 Claims, 27 Drawing Sheets
(18 of 27 Drawing Sheet(s) Filed in Color)

[FIG. 1]
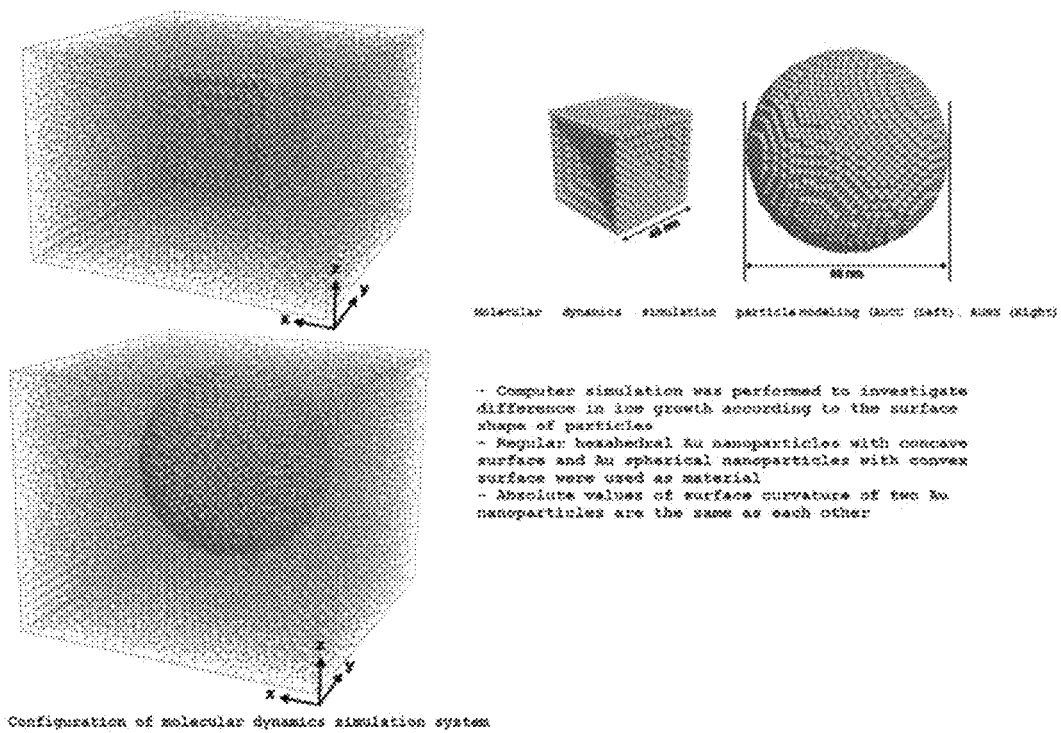

[FIG. 2]
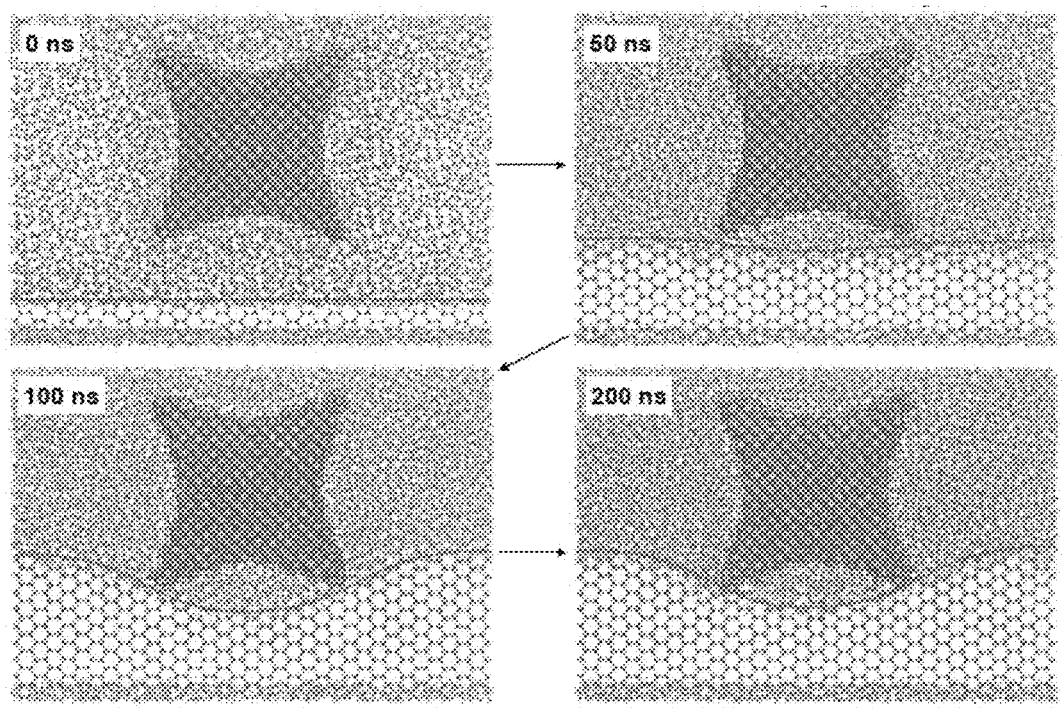

[FIG. 3]
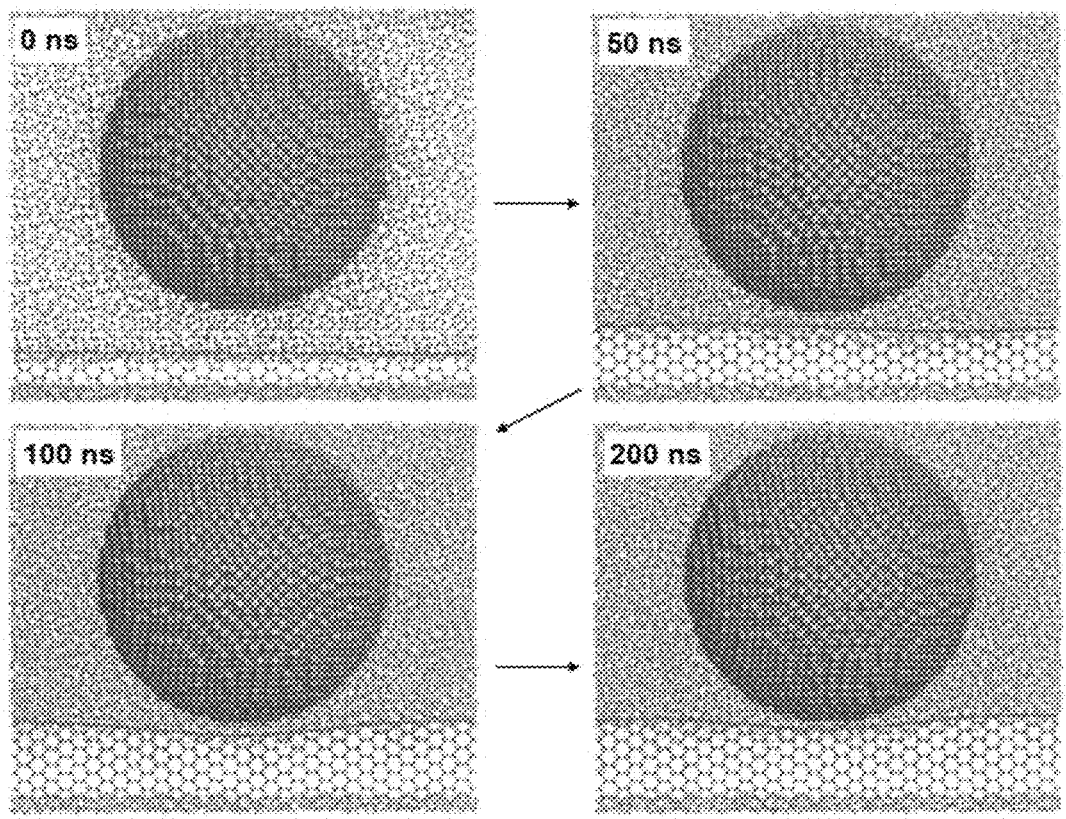

[FIG. 4]
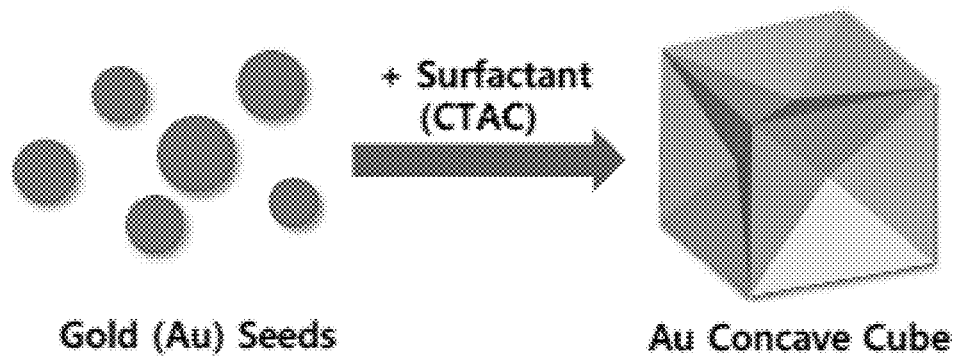
[FIG. 5]
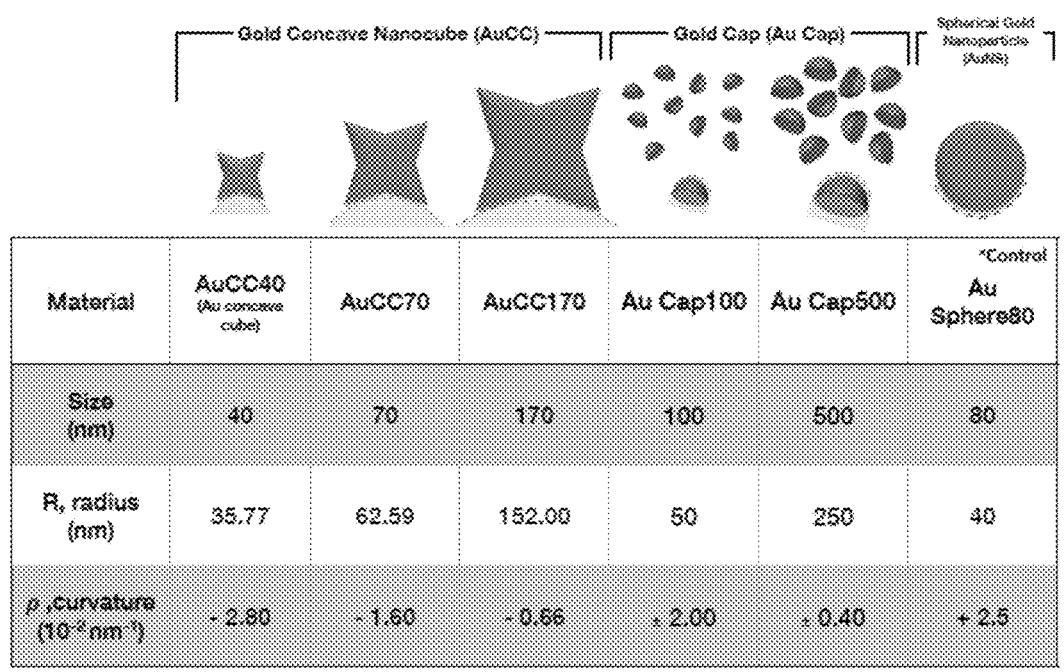

[FIG. 6]
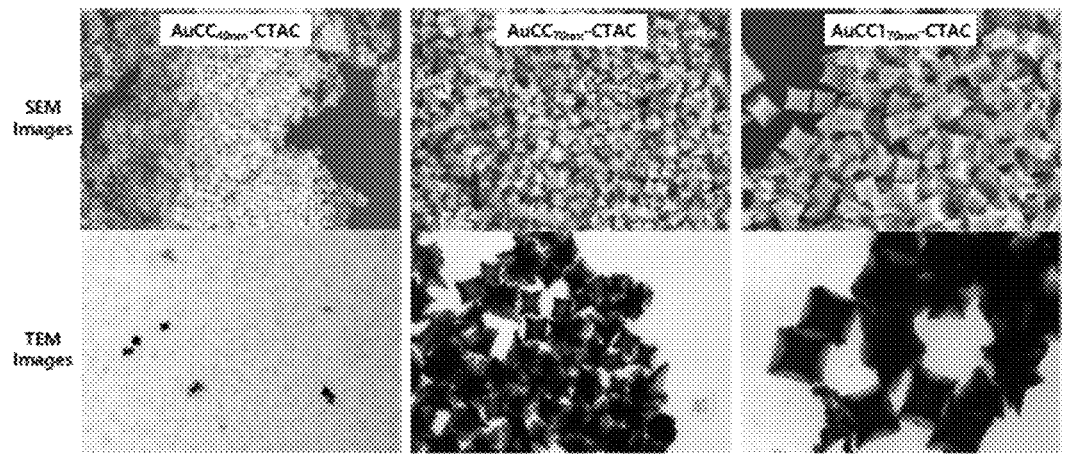
[FIG. 7]
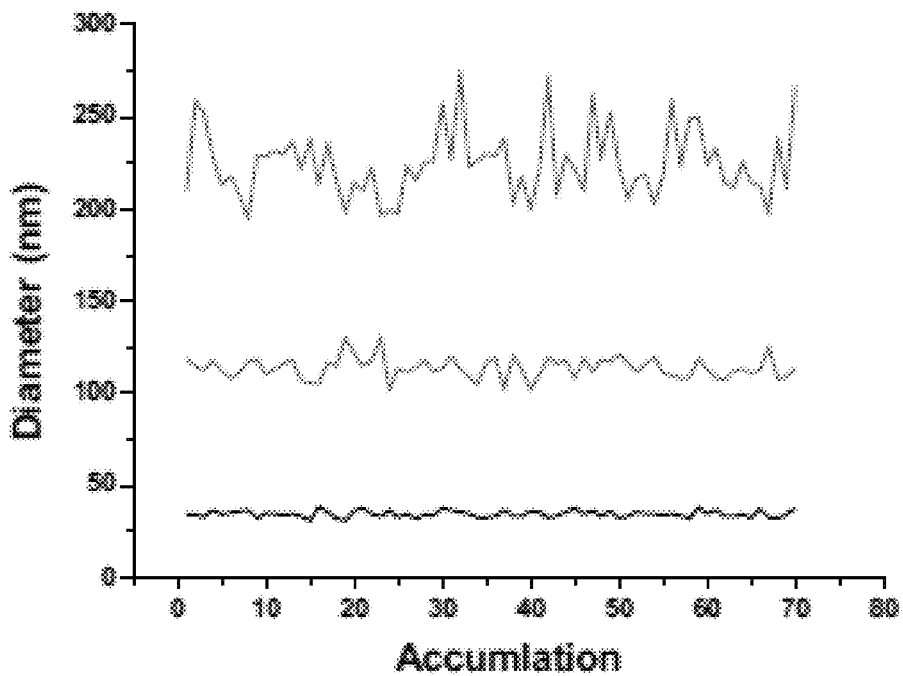

[FIG. 8]
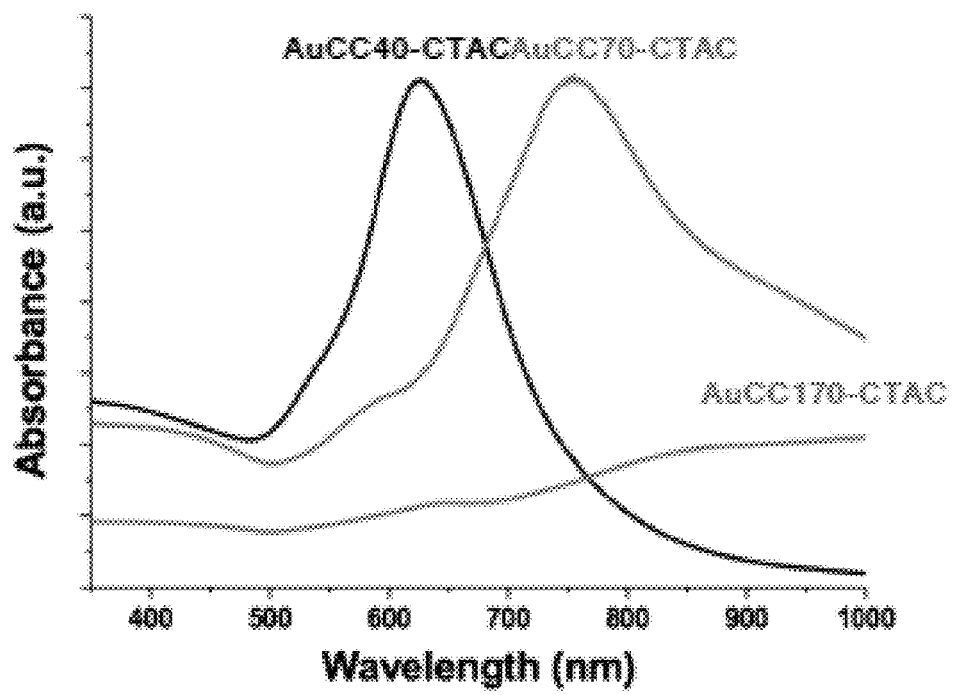

[FIG. 9]
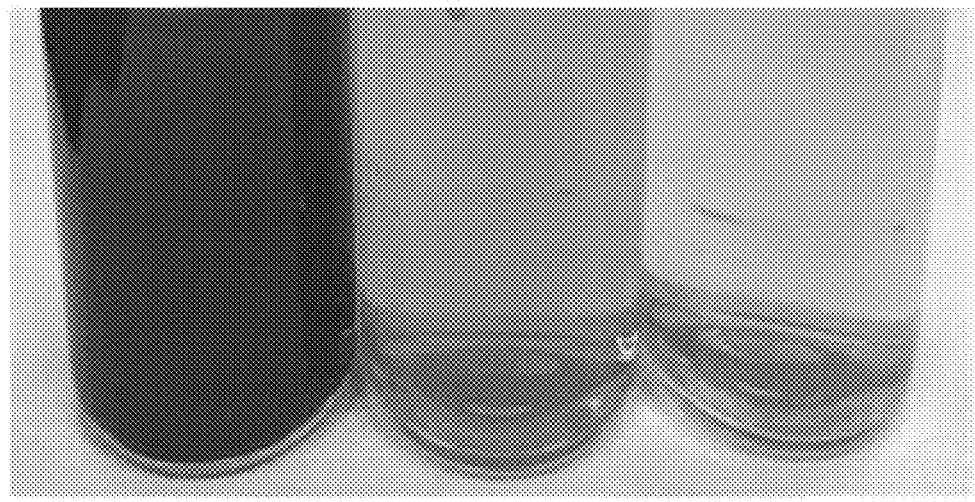

[FIG. 10]
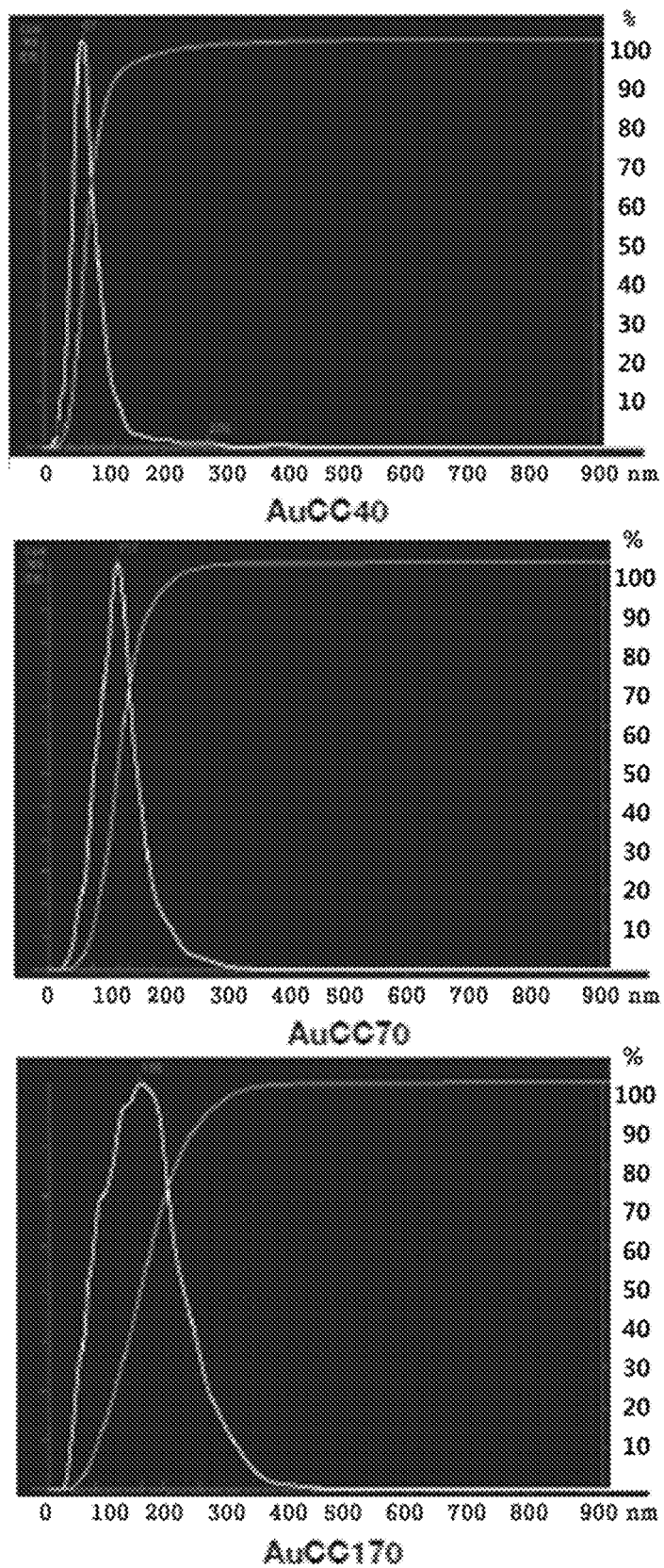

[FIG. 11]
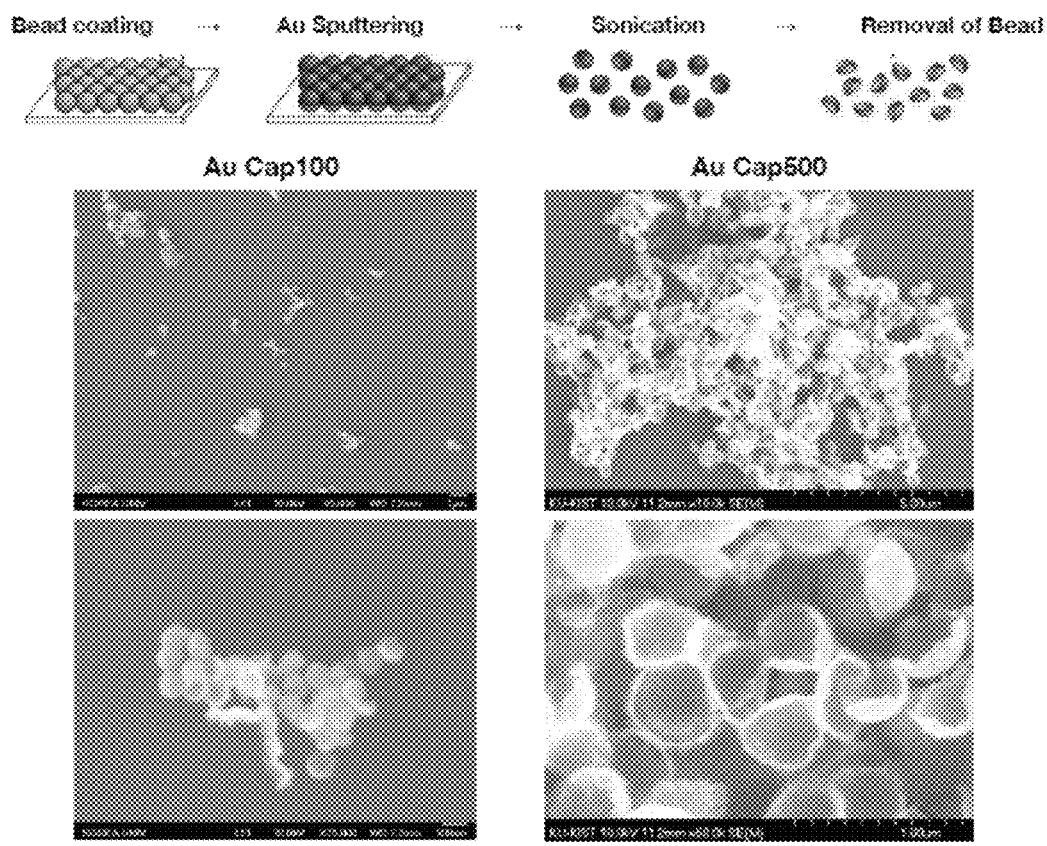

[FIG. 12]
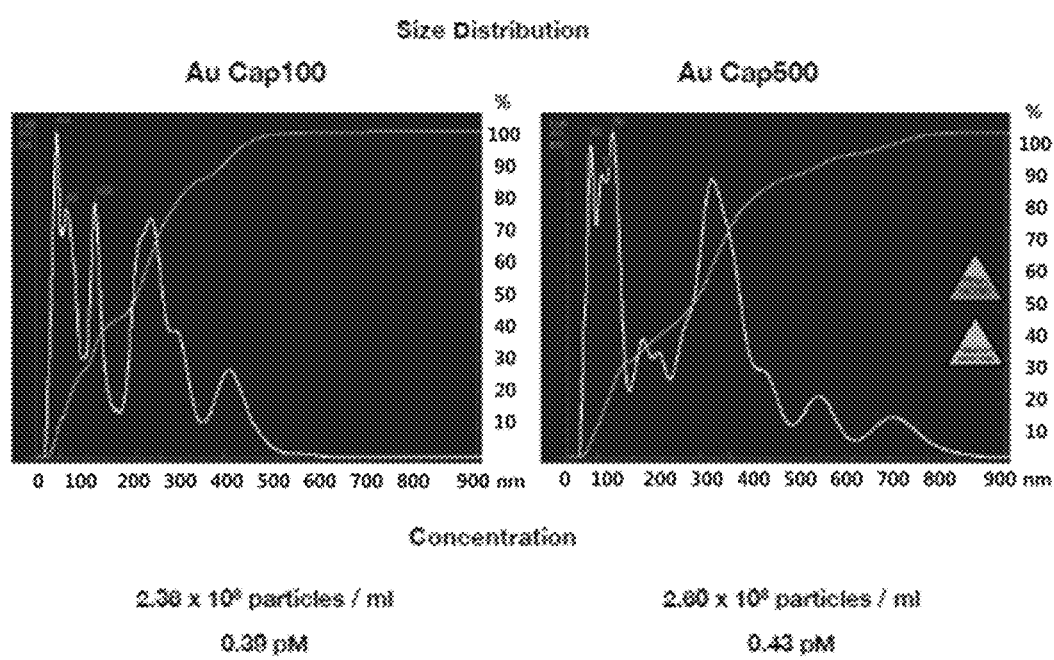

[FIG. 13]
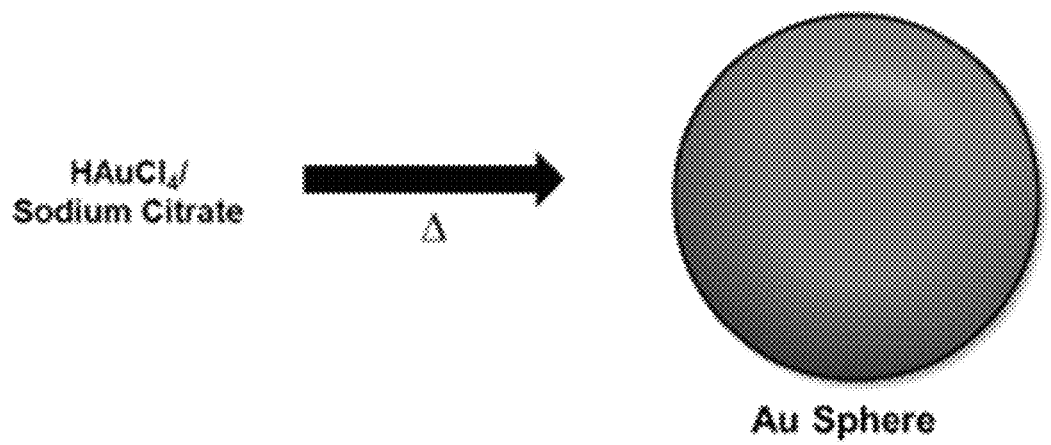
- Frens method: Citrate capable of simultaneously serving as reductant and copping agent was used
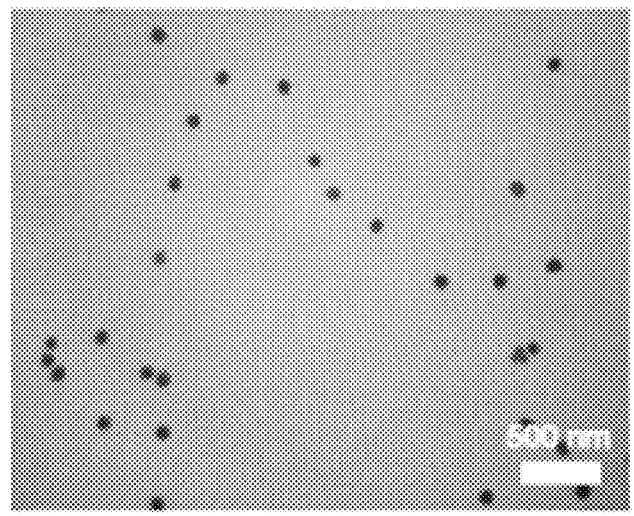

[FIG. 14]
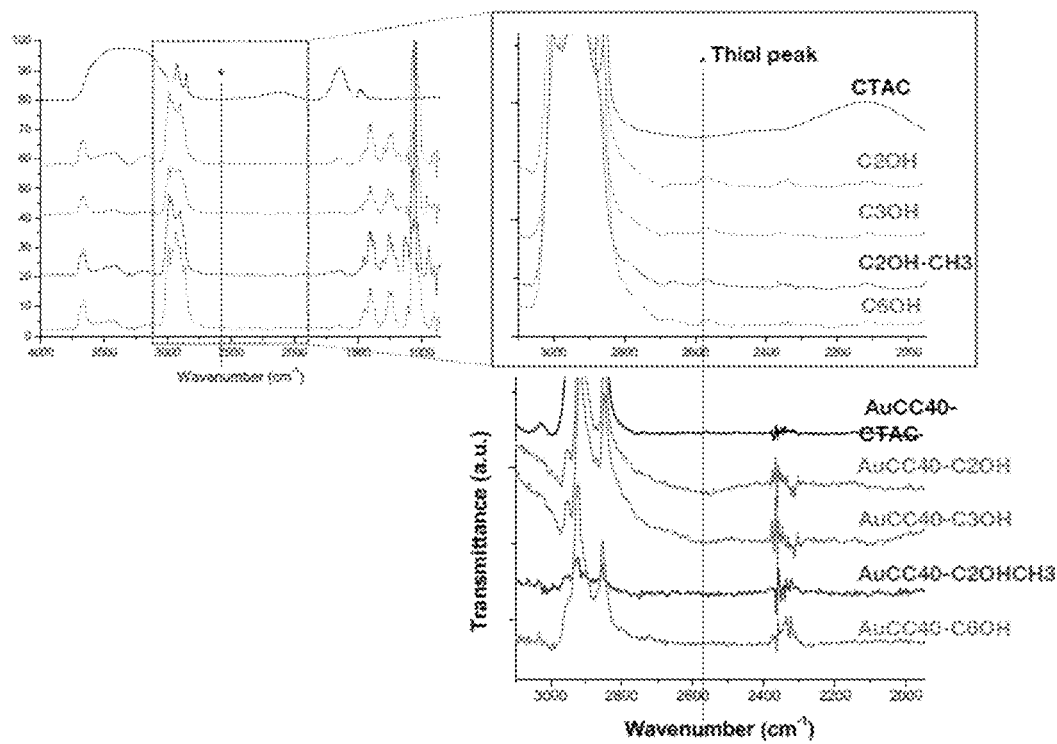

[FIG. 15]
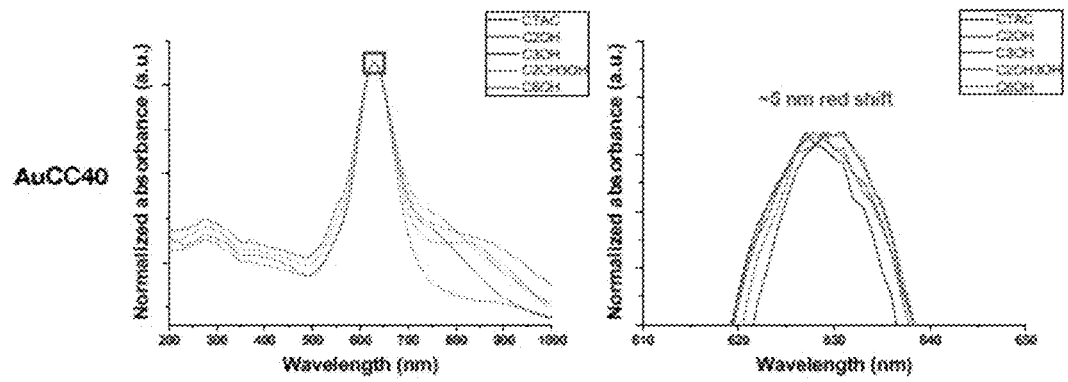
[FIG. 16]
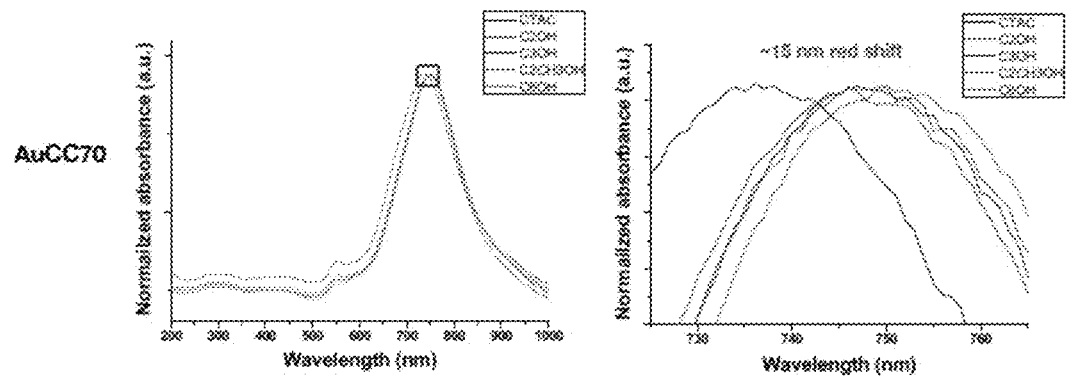
[FIG. 17]
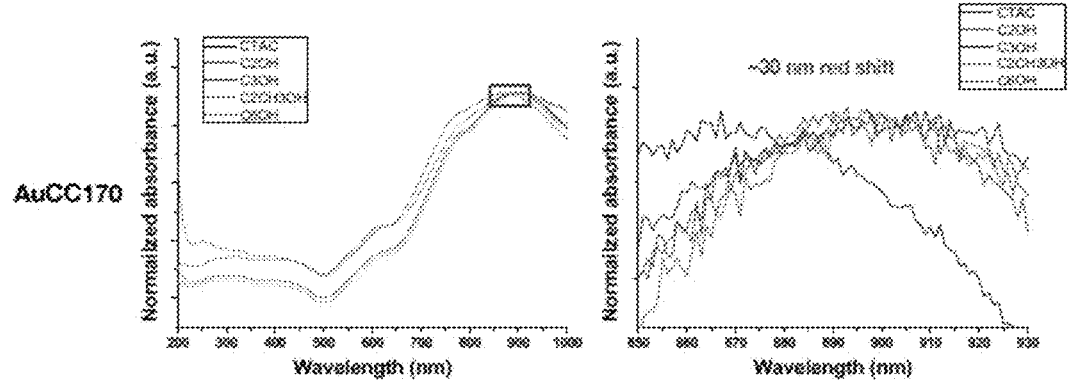

[FIG. 18]
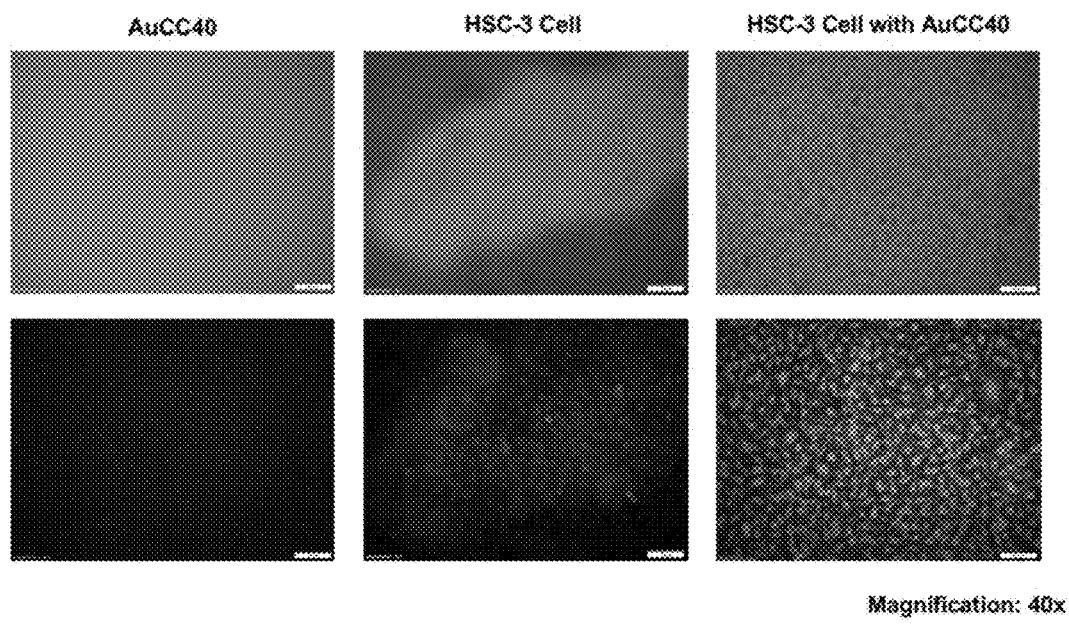

[FIG. 19]
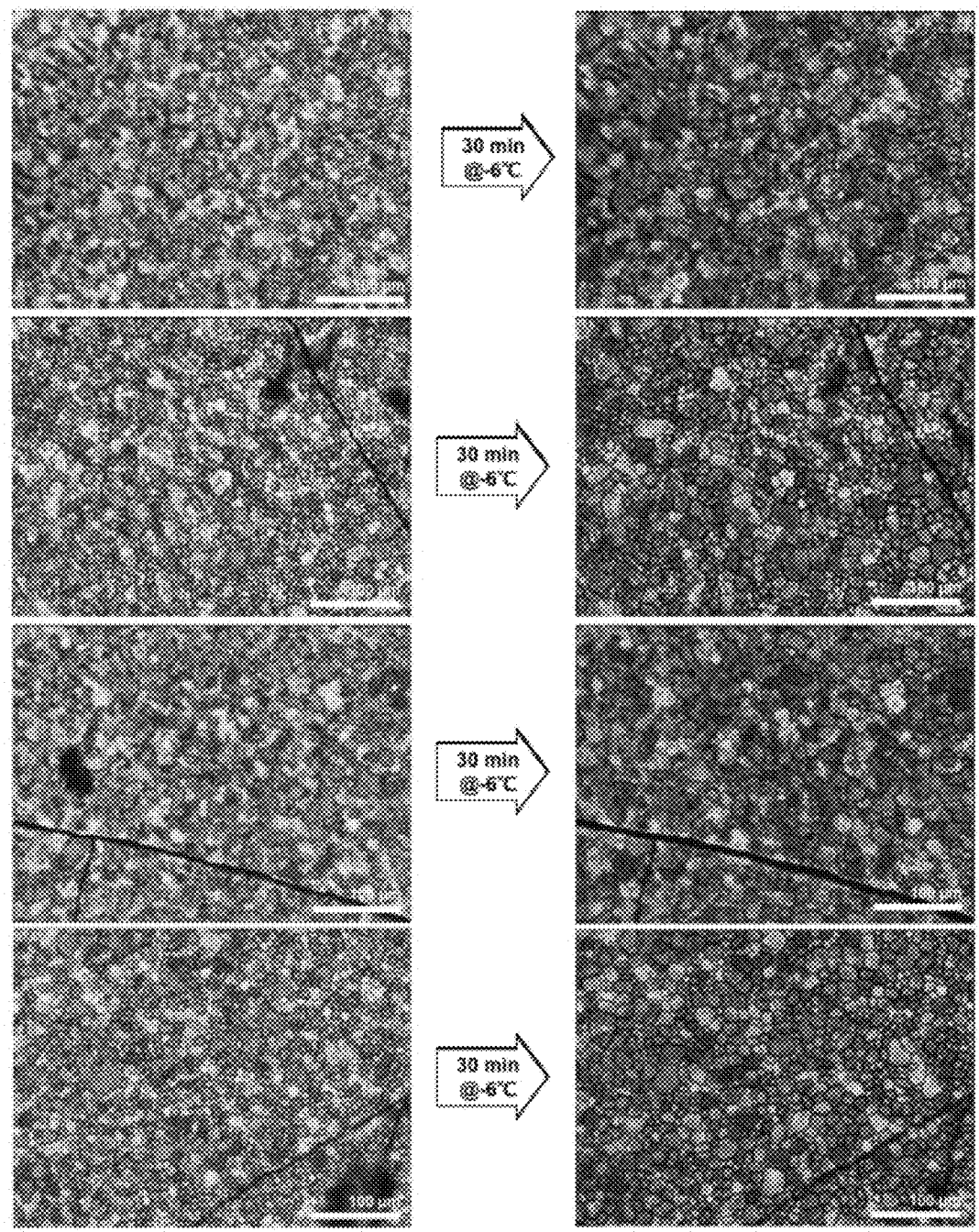

[FIG. 20]
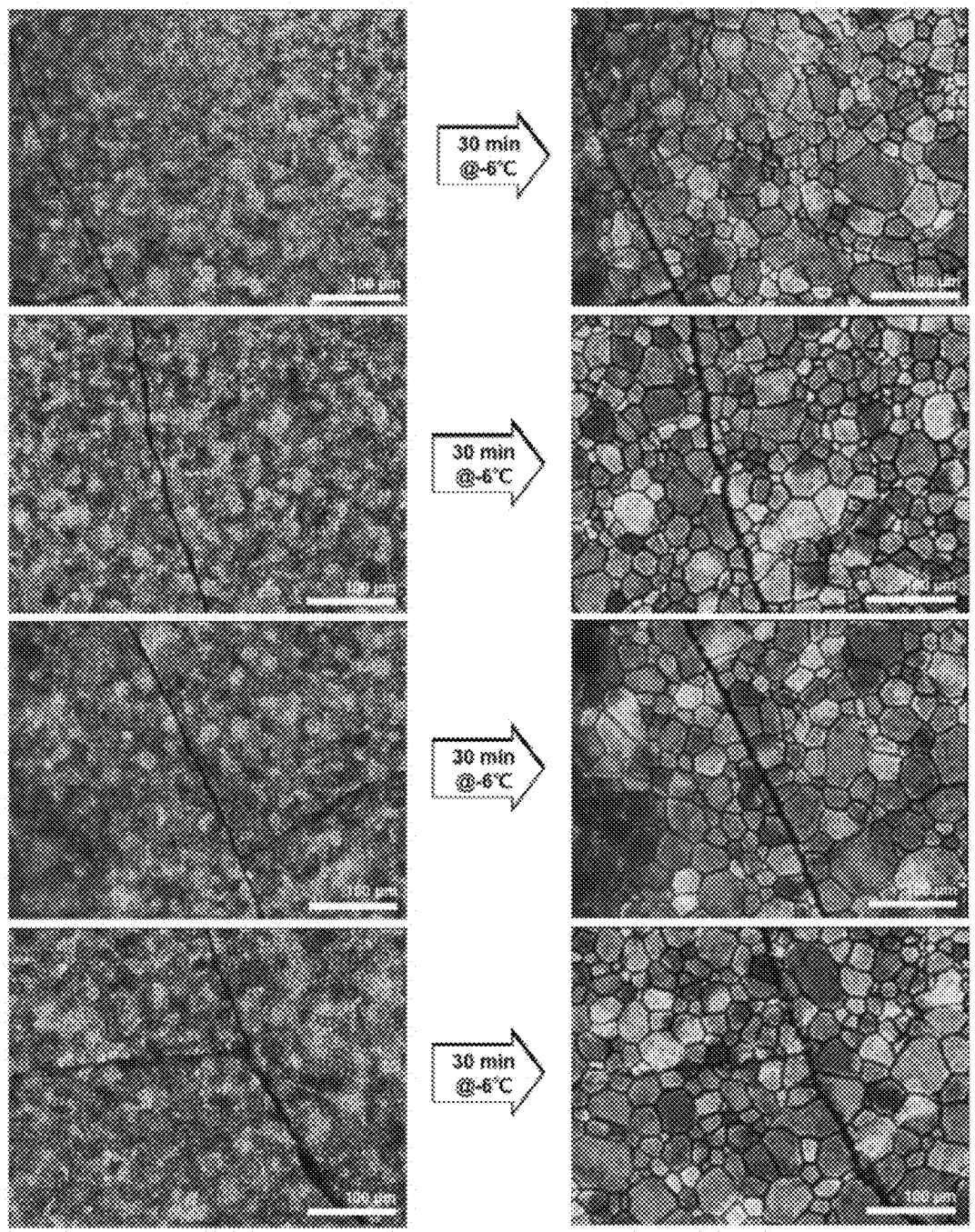

[FIG. 21]
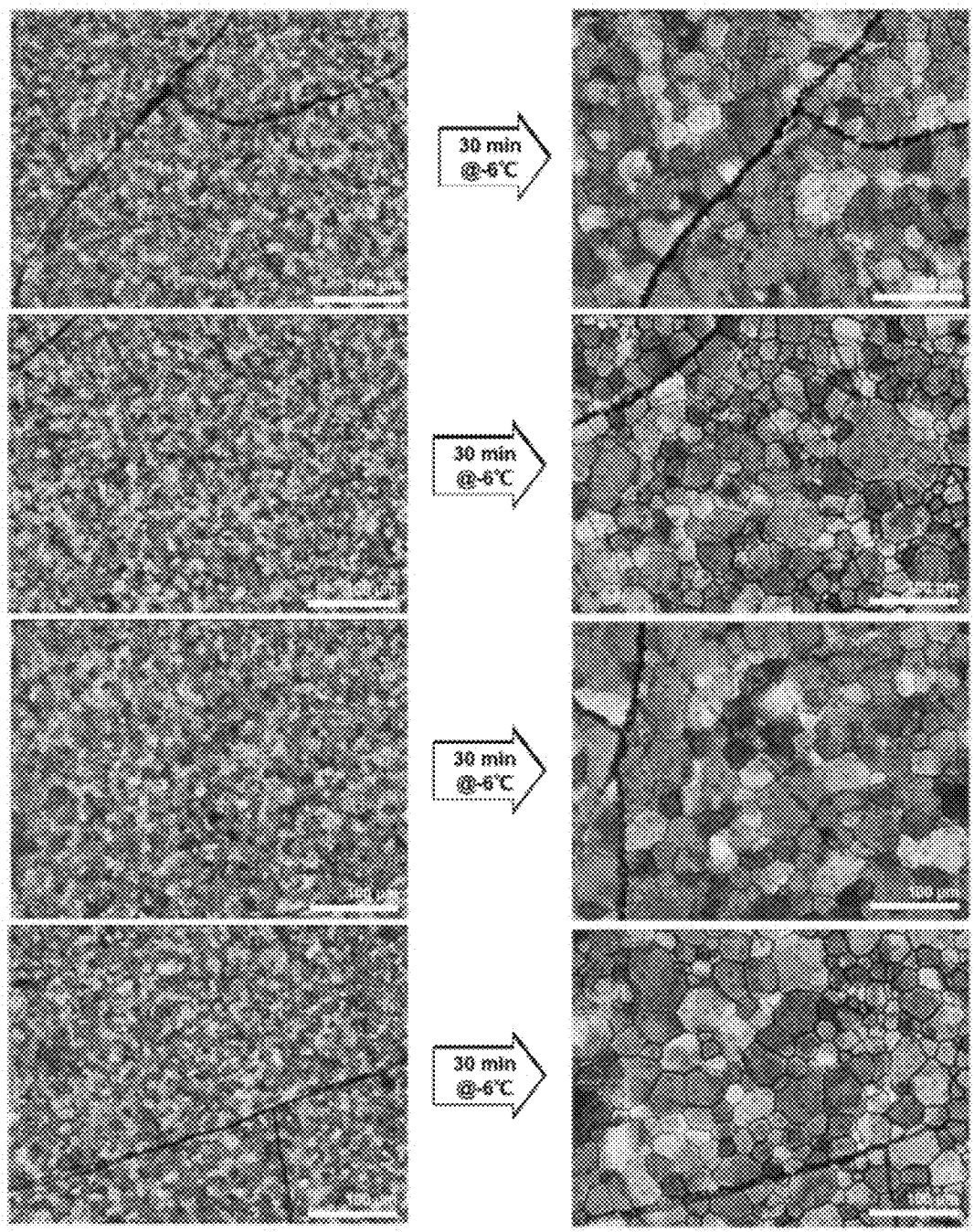

[FIG. 22]
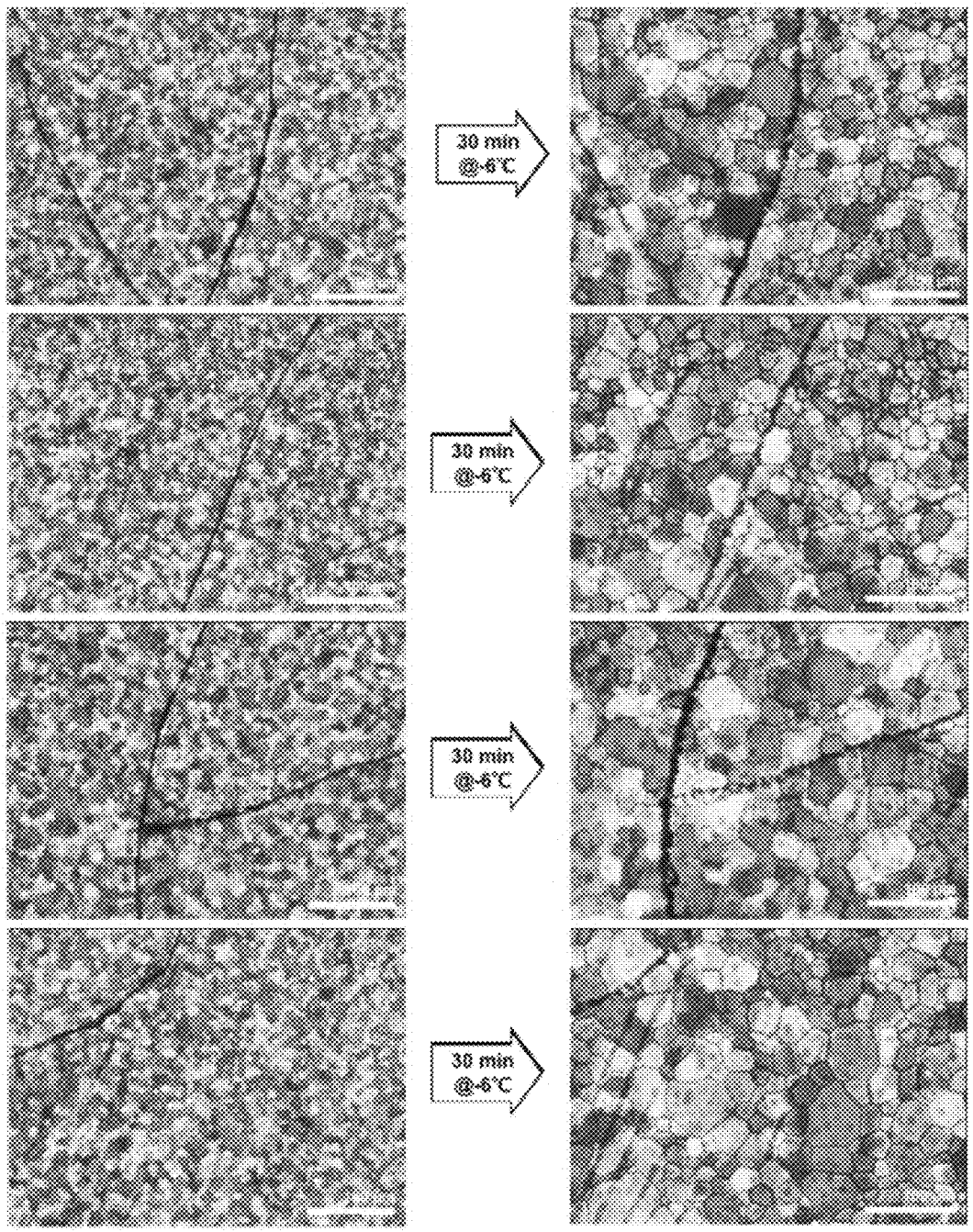

[FIG. 23]
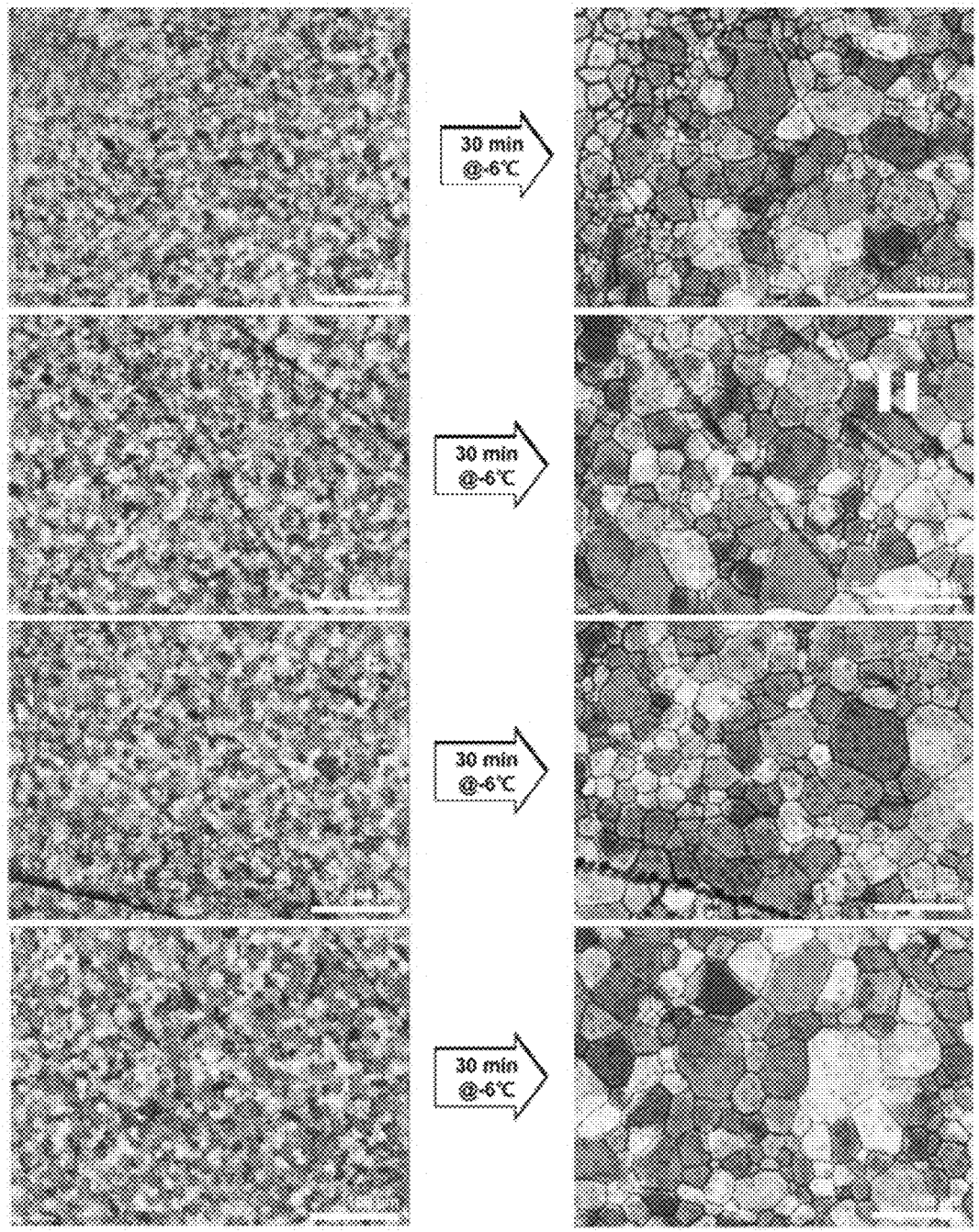

[FIG. 24]
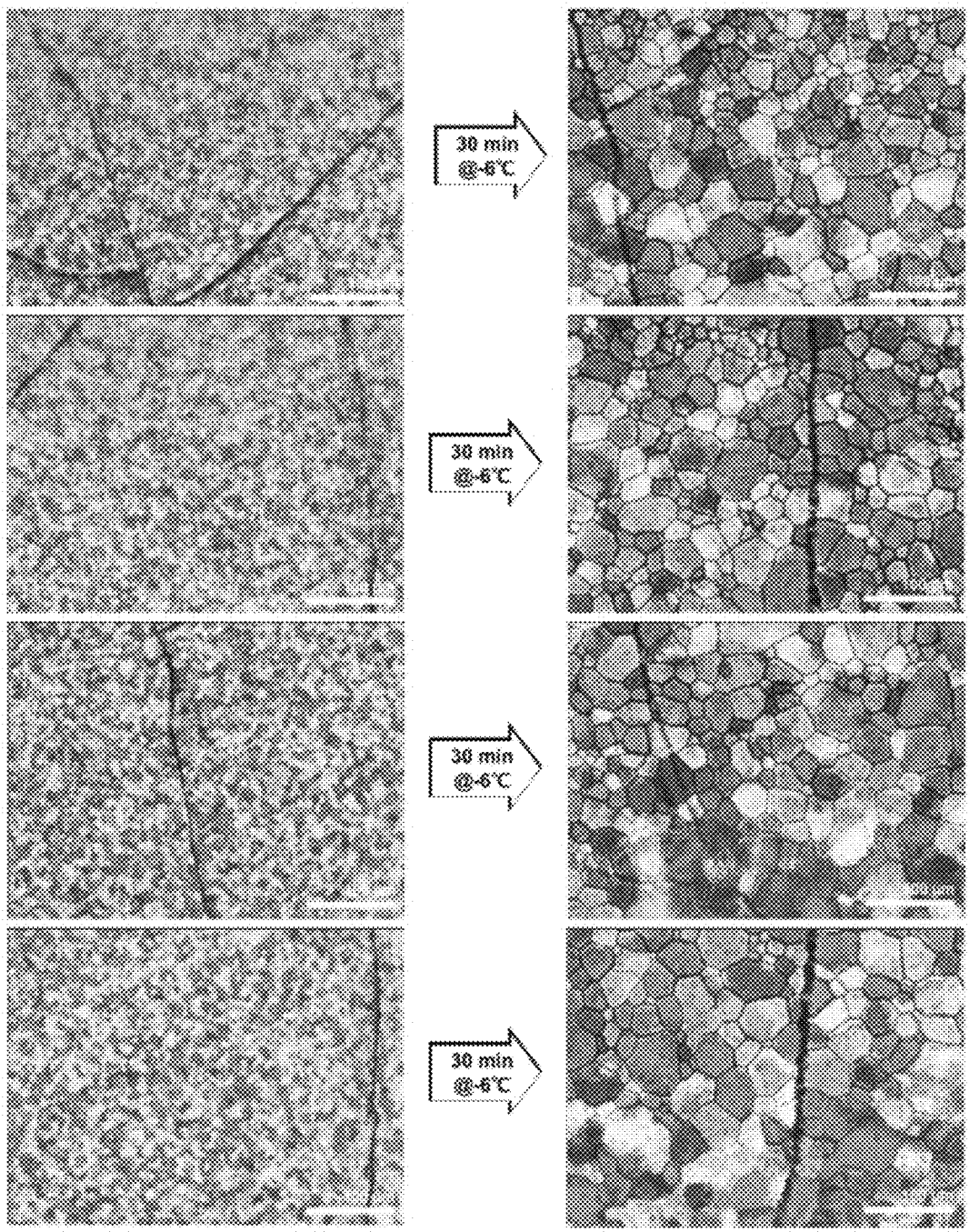

[FIG. 25]
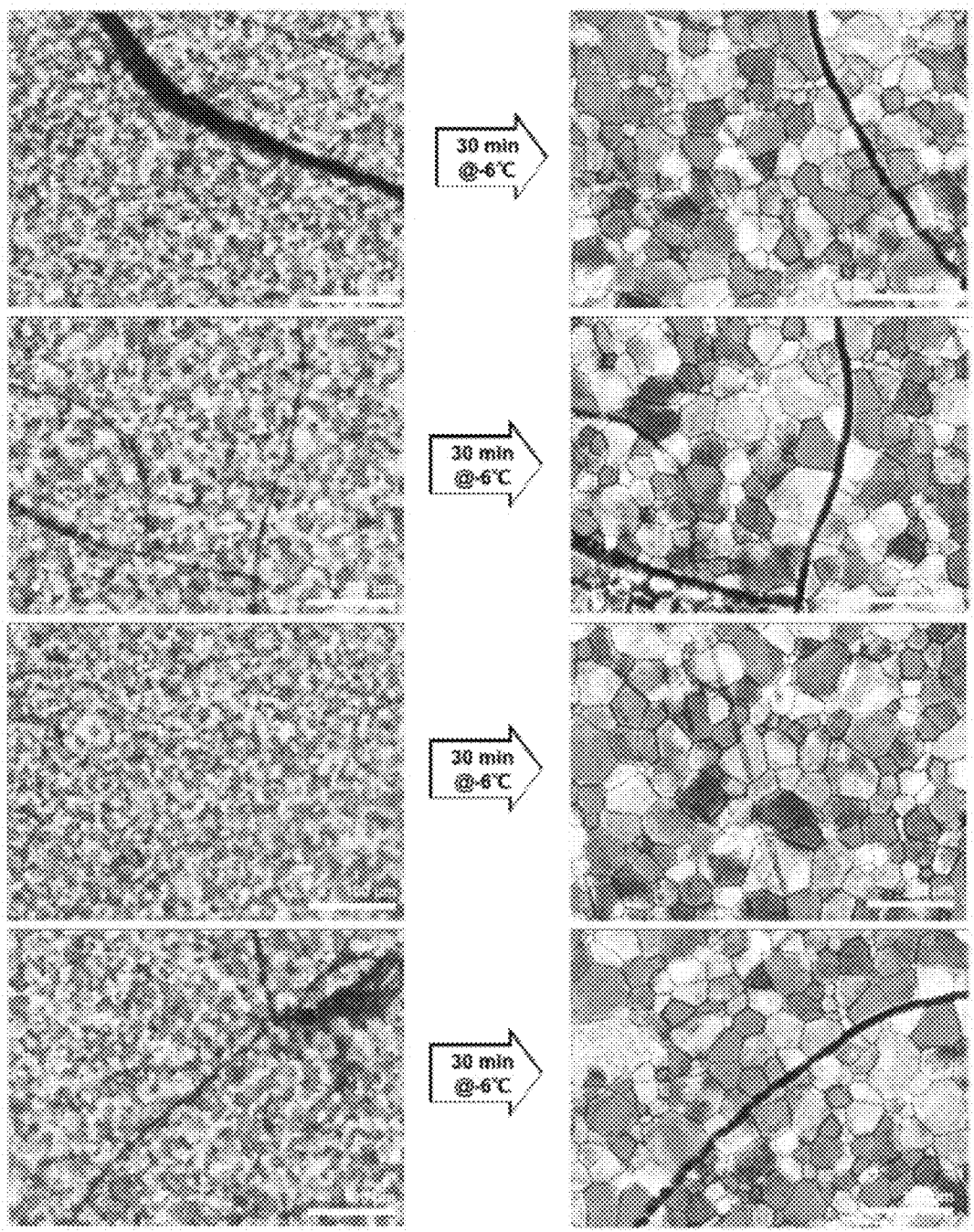

[FIG. 26]
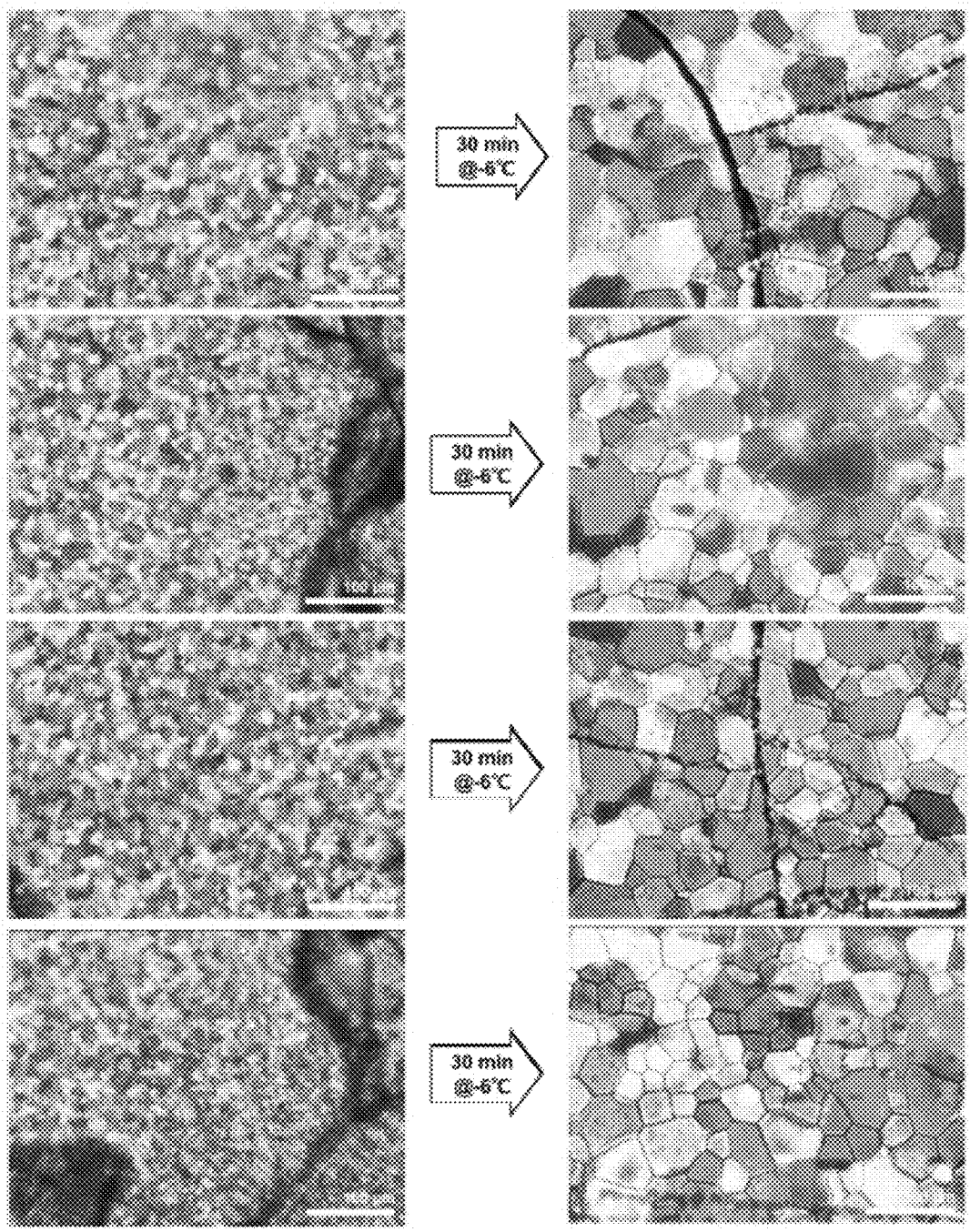

[FIG. 27]
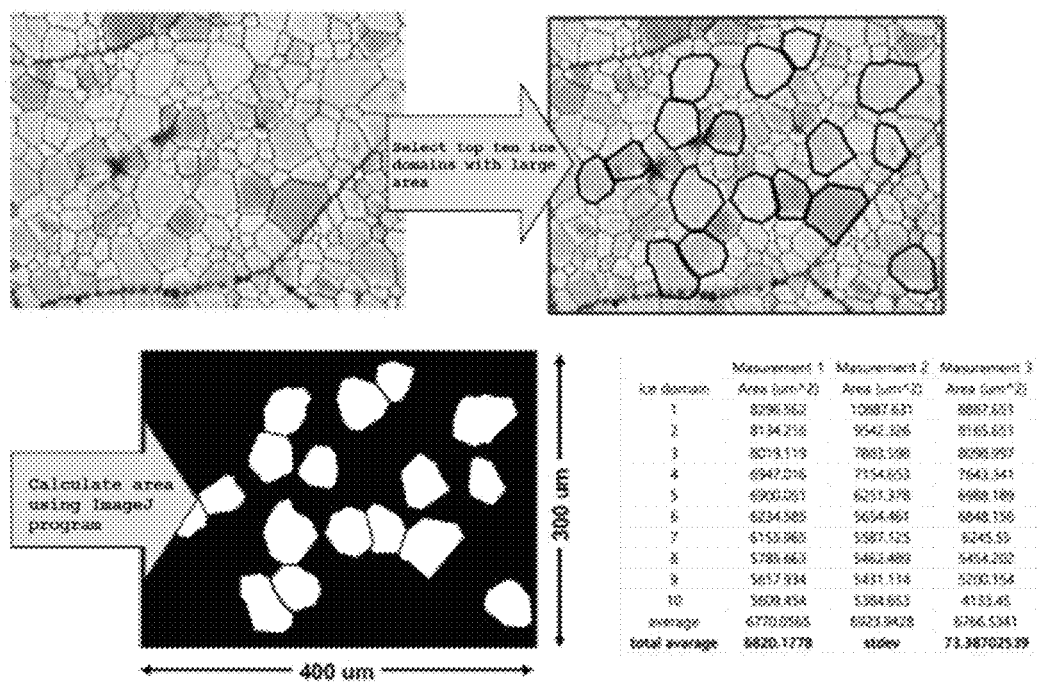

[FIG. 28]
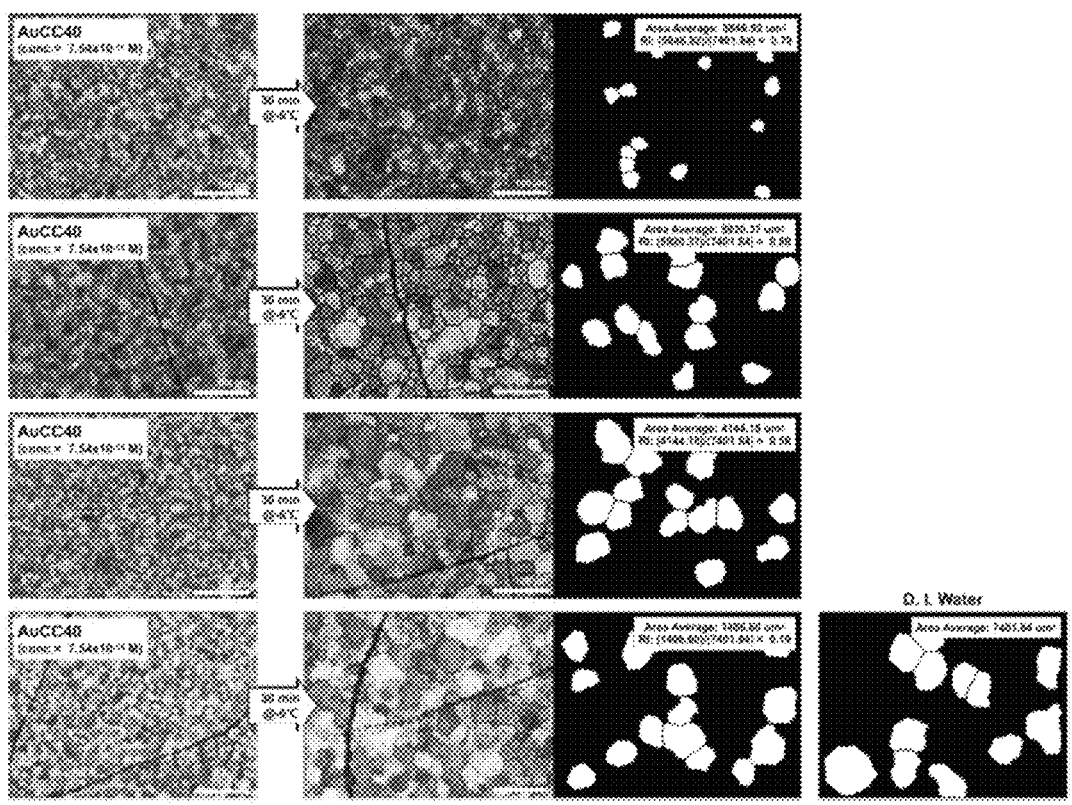

[FIG. 29]
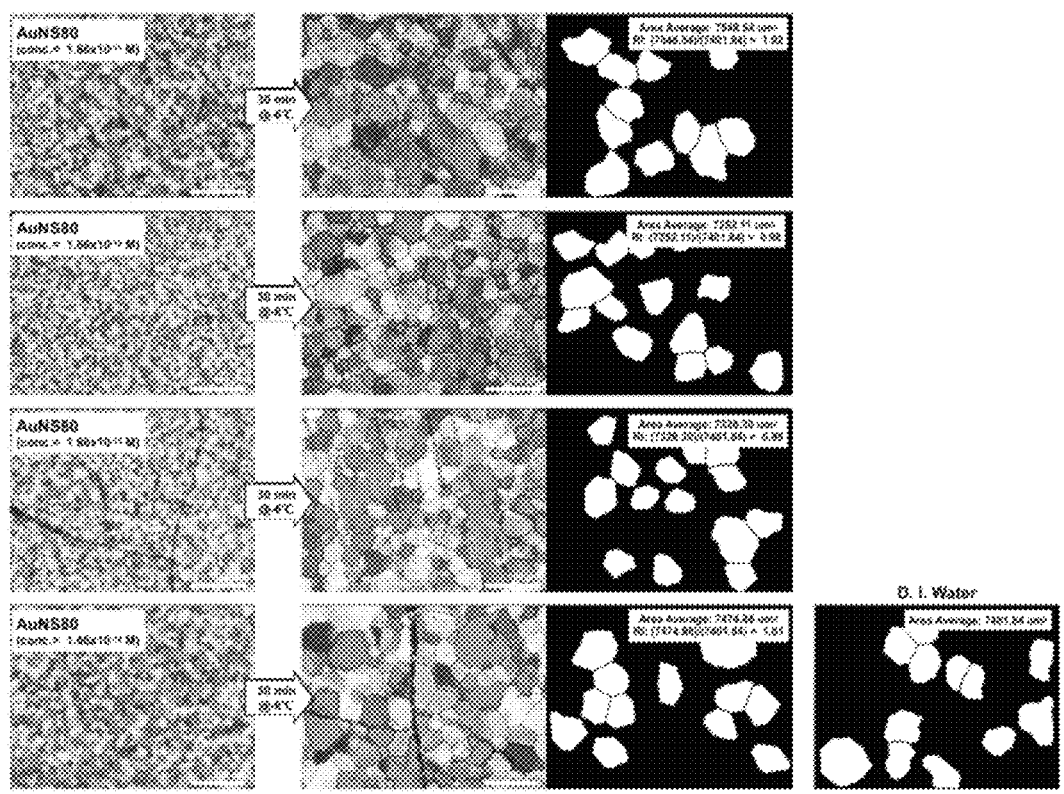

[FIG. 30]
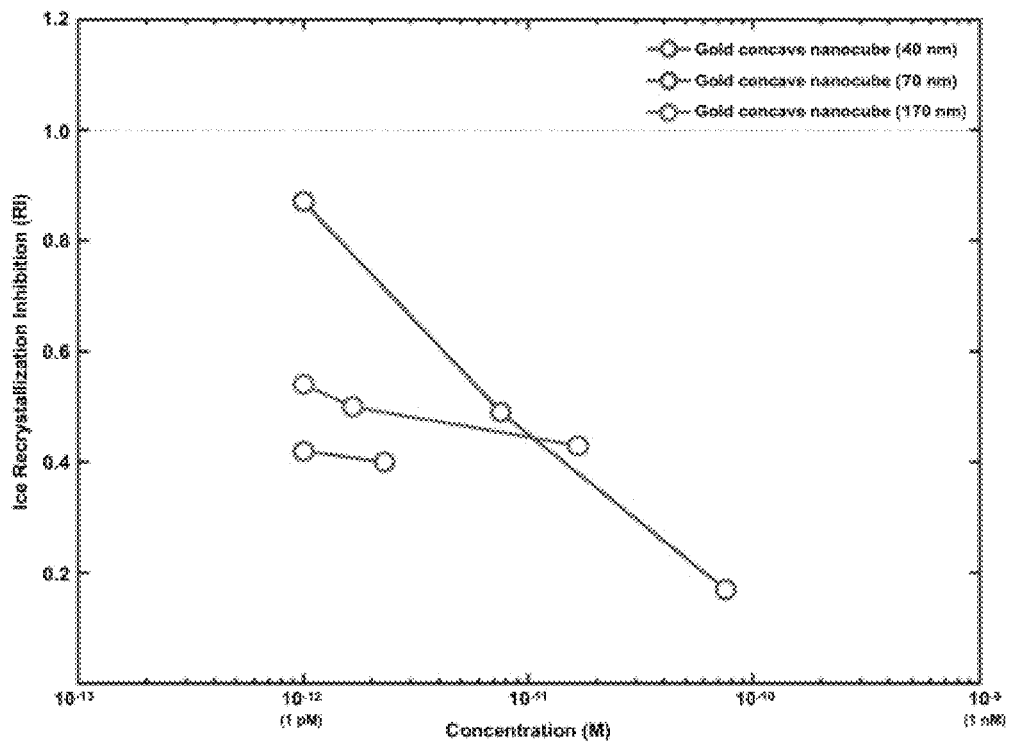
[FIG. 31]
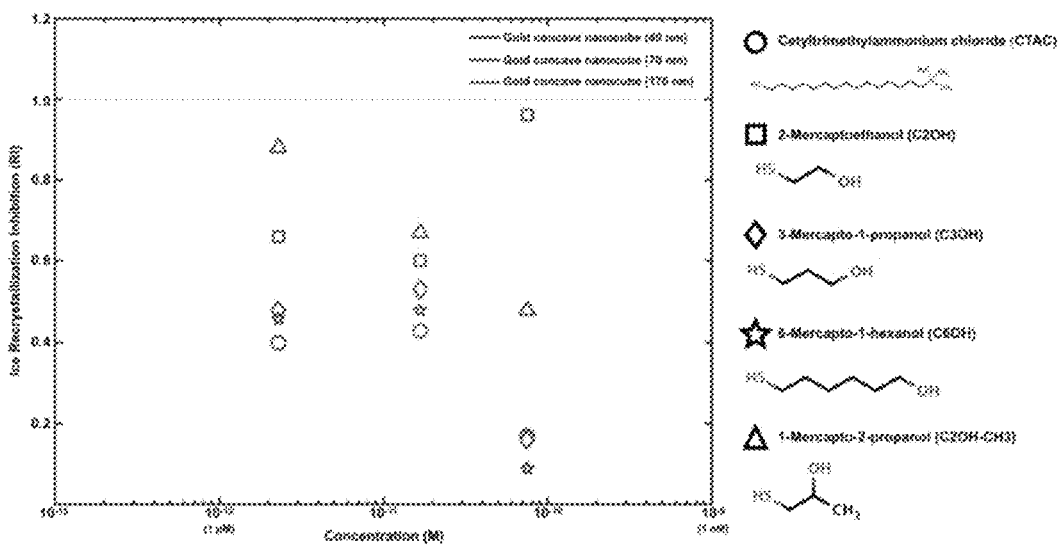

[FIG. 32]
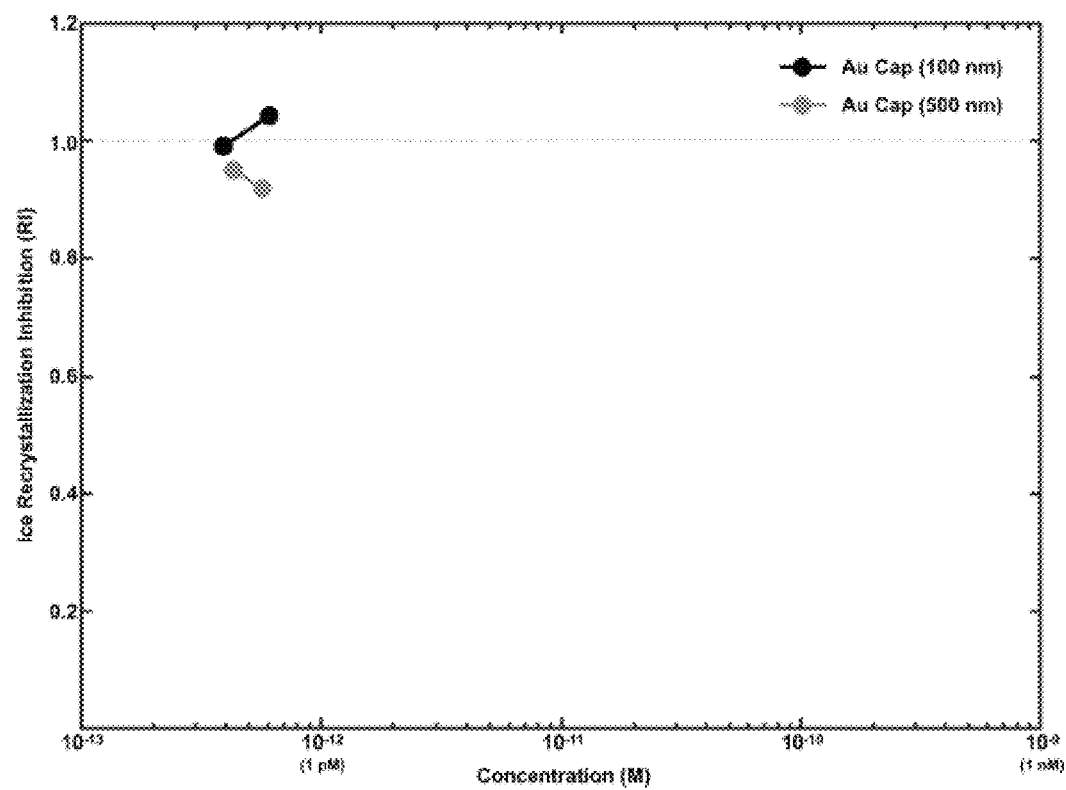

COMPOSITION FOR ANTIFREEZING

CROSS REFERENCE TO RELATED APPLICATIONS

The present application claims priority on Korean Patent Application No. 10-2019-0154268 filed on Nov. 27, 2019, which is hereby incorporated by reference in its entirety.

BACKGROUND OF THE INVENTION

1. Field of the Invention

The present invention relates to a composition for antifreezing.

2. Description of the Related Art

A cryoprotective agent (CPA) is a compound capable of reducing or inhibiting ice crystal formation in a solution exposed to a temperature below zero (0) when present in the solution. Current CPA includes small molecules (often referred to as permeable CPAs), synthetic polymers, and cryoprotective proteins.

Currently, organ transplantation is the best treatment for end-stage organ failure in terms of a survival rate, quality of life, and cost effectiveness. Unfortunately, there is a steep gap between supply and demand of organ implants, which is one of important medical barriers that cause patients with debilitating diseases to experience low quality of life over a long period of waiting time. A marked lack of organs is due to significant amount of waste resulting from the absence of a reliable preservation method. Indeed, more than 50% of organs such as a lung, pancreas, and heart remain with being unharvested from the deceased donors.

In order to properly preserve the harvested organ, it is necessary to wash the organ with a preservative solution to remove blood, and stabilize the organ. Even after stabilizing the organ in the preservation solution, an available time for assignment, transport, and transplantation of the organ after removal from the donor is limited (about 6 to 12 hours). Due to such a small amount of time, most of the harvested organs will be distributed only to local patients. The reason is that it is not possible to identify the matching of organ in remote patients within a limited time. As a result of such a shortage, and although laws for prohibiting the sale of human organs are present in almost every country, illegal organ transactions and human trafficking have been increased to supply the demanded amount of the organs.

Current permeable CPAs used for long term storage generally include in particular ethylene glycol, 1,2-propanediol, dimethyl sulfoxide, formamide, glycerol, sucrose, lactose and D-mannitol. In order to reduce or inhibit ice crystal growth at a temperature required for long term storage, an effective concentration of the permeable CPAs should be very high (60% or more thereof is often required). At such a high concentration, these compounds may be toxic to tissues that are trying to be preserved by the same, and mass removal of the CPAs may result in irreversible cell death upon warming prior to the transplantation.

Other CPAs used to reduce or inhibit ice crystal formation include synthetic polymers and cryoprotective proteins. Similar to the permeable CPA, each of them has their own drawbacks. For example, the synthetic polymer cannot penetrate a cell membrane. Thus, synthetic polymer CPA can only serve to control extracellular ice formation. In order to effectively preserve biological samples, ice crystal formation should be controlled both inside and outside the cell. Naturally-occurring cryoprotective proteins such as proteins isolated from fishes, plants, or insects, for example, are highly effective in preventing ice formation, but currently available cryoprotective proteins are extremely expensive as well as have a low purity. Additionally, the use of cryoprotective proteins for preserving the biological samples leads to an introduction of a potential supply source of immunogenicity.

PRIOR ART DOCUMENT

Patent Document

Korean Patent Registration No. 1681973

SUMMARY OF THE INVENTION

An object of the present invention is to provide a composition for antifreezing.

In addition, another object of the present invention is to provide a composition for freezing a cell or tissue to increase a survival rate of the cell.

Further, another object of the present invention is to provide a composition for freezing a food which can maintain a texture thereof even when freezing the food.

To achieve the above objects, the following technical solutions are adopted in the present invention.

1. A composition for antifreezing comprising a gold (Au) nanostructure in which at least a portion thereof is concave.

2. The composition according to the above 1, wherein the Au nanostructure includes a concave portion formed on at least one surface thereof, and has a shape of tetrahedron, hexahedron, octahedron, decahedron, dodecahedron, icosahedron, tetrakis_hexahedron, hexakis_octahedron, rhombic dodecahedron, cylinder, saddle or cap.

3. The composition according to the above 1, wherein the Au nanostructure includes a concave portion formed on at least one surface thereof, and has a shape of tetrahedron, hexahedron, octahedron, decahedron, dodecahedron, icosahedron, tetrakis_hexahedron or hexakis_octahedron. 4. The composition according to the above 1, wherein the Au nanostructure has a size of 10 nm to 1000 nm.

5. The composition according to the above 1, wherein the concave portion has an absolute value of a surface curvature of $0.1 \times 10^{-2}$ $nm^{-1}$ to $5 \times 10^{-2}$ $nm^{-1}$.

6. The composition according to the above 1, wherein the Au nanostructure has increased hydrophilicity by modifying a surface thereof.

7. A composition for freezing a cell or tissue comprising the composition according to any one of the above 1 to 6.

8. A composition for freezing a food comprising the composition according to any one of the above 1 to 6.

9. A method for freezing a cell or tissue comprising exposing a cell or tissue of a subject to a temperature below zero in the presence of the composition according to the above 7.

The composition of the present invention is excellent in an effect of ice recrystallization inhibition. Thereby, when cryopreservation of cells through the inventive composition, it is possible to increase the survival rate of the cells, and maintain the texture of food even when using in the freezing of food.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and other advantages of the present invention will be more clearly understood from the following detailed description taken in conjunction with the accompanying drawings, in which:

FIGS. 1 to 3 are views showing molecular dynamics simulation results of antifreezing of metal nanostructures.

FIG. 4 is a schematic diagram illustrating a process of manufacturing a gold (Au) concave nanocube (AuCC in the drawings).

FIG. 5 is a view and a table showing specifications of the prepared Au concave nanocubes, gold (Au) nanocaps (Au Cap in the drawings), and gold (Au) spherical particles (AuNS in the drawings).

FIG. 6 is SEM and TEM images of the prepared Au concave nanocube.

FIG. 7 is a graph showing a size of the prepared Au concave nanocube.

FIG. 8 is a graph showing absorption spectra of the prepared Au concave nanocubes.

FIG. 9 is a photograph showing the prepared Au nanocubes.

FIG. 10 is diagram showing particle size distributions of the prepared Au concave nanocubes.

FIG. 11 is microscopy images of the prepared Au nanocaps.

FIG. 12 is graph showing concentrations and particle size distributions of the prepared Au nanocaps.

FIG. 13 is a schematic diagram showing a process of manufacturing gold (Au) spherical particles and a microscopy image of the prepared Au spherical particles.

FIG. 14 is graphs showing Fourier-transform infrared spectroscopy (FTIR) results for illustrating that sulfhydryl peaks of compounds disappear due to surface modification of the Au concave nanocubes.

FIGS. 15 to 17 are graphs showing changes in the absorption spectrum of the Au concave nanocubes due to the surface modification.

FIG. 18 is images capable of confirming that the Au concave nanocubes are inserted into HSC-3 cell.

FIGS. 19 to 26 are images showing an effect of ice recrystallization inhibition of gold (Au) nanostructures.

FIG. 27 is a schematic diagram quantifying the effect of ice recrystallization inhibition.

FIGS. 28 to 32 are images and graphs showing quantification results of the effect of ice recrystallization inhibition of the Au nanostructures.

DETAILED DESCRIPTION OF THE INVENTION

Hereinafter, the present invention will be described in detail.

The present invention relates to a composition for antifreezing.

Ice crystals can grow through ice recrystallization, which refers to a process of growing from small ice crystals to larger ice crystals, and the growth thereof occurs according to Ostwald ripening mechanism. The Ostwald ripening may be performed in a dissolution-diffusion-refreezing or a sublimation-diffusion-condensation mechanism. In other words, the growth of ice crystals does not occur as the ice crystals are adhered to each other, but rather as small ice crystals are melted between the crystals, and spread toward large ice crystals, thus to be a part of large ice crystals while refreezing.

Antifreezing refers to actions of preventing ice formation or lowering a speed of ice formation, preventing ice recrystallization or lowering a speed of ice recrystallization, or maintaining a size of ice crystals to be small.

The composition for antifreezing of the present invention includes an Au nanostructure in which at least a portion thereof is concave.

As illustrated in FIG. 2, when the Au nanostructure, in which at least a portion thereof is concave, comes into contact with ice crystal growth surfaces, ice does not grow on the surfaces in contact with the concave portion, but a liquid water layer is formed thereon, and the ice is pushed out of the concave portion. Therefore, an effect of antifreezing may be exhibited in the corresponding portion.

The Au nanostructure has a concave portion on at least one surface thereof. When the Au nanostructure has the concave portion, the effect of antifreezing may be exhibited on at least the concave portion. Therefore, for this purpose, any Au nanostructure may be used so long as at least a portion of at least one surface has a concave portion, and the concave portions may be present on one or more surfaces, or otherwise, all the surfaces or less.

The Au nanostructure may have a shape such as, for example, tetrahedron, hexahedron, octahedron, decahedron, dodecahedron, icosahedron, tetrakis hexahedron, hexakis octahedron, rhombic dodecahedron, cylinder, saddle or cap, but it is not limited thereto.

For example, the Au nanostructure may have a size of 10 nm to 1000 nm, specifically 20 nm to 800 nm, and more specifically 40 nm to 700 nm, but it is not limited thereto. For example, when the Au nanostructure is a polyhedron, the size may be a length of one side, and when it is the cap shape, the size may be a diameter, but it is not limited thereto. More specifically, when the Au nanostructure is the polyhedron, the size may be 20 nm to 200 nm, and when it is the cap shape, the size may be 10 nm to 1000 nm, but it is not limited thereto.

For example, the concave portion of the Au nanostructure may have an absolute value of a surface curvature of $0.1 \times 10^{-2}$ nm$^{-1}$ to $5 \times 10^{-2}$ nm$^{-1}$, and specifically $0.3 \times 10^{-2}$ nm$^{-1}$ to $3 \times 10^{-2}$ nm$^{-1}$, but it is not limited thereto.

The Au nanostructure may have cetyl trimethyl ammonium chloride or cetyl trimethylammonium bromide on a surface thereof as a functional group.

In addition, the Au nanostructure may have hydrophilic, hydrophobic or amphoteric functional groups by modifying the surface thereof. In such a case, the effect of antifreezing may be decreased or increased, thus to more accurately control the freezing.

Examples of the hydrophilic functional group may include, for example, a hydroxyl group, a carboxyl group, an amino group, a carbonyl group, a phosphate group, an ammonium group, an ester group, an imide group, a thioimide group, a keto group, an ether group, an indene group, a sulfonyl group, a polyethylene glycol group and the like. The hydrophobic functional group may include, for example, C1 to C30 alkyl group, C3 to C30 cycloalkyl group, C6 to C30 aryl group, C2 to C30 heteroaryl group, halogen group, C1 to C30 ester group, halogen-containing group and the like. The amphoteric functional group may include, for example, hydroxy C1 to C10 alkyl group, a peptide including threonine, and the like, but it is not limited thereto.

The functional groups may be formed on the surface of the Au nanostructure by modifying the surface of the Au nanostructure with, for example, a compound having the hydrophilic, hydrophobic or amphoteric functional group and —SH functional group at an end thereof, but it is not limited thereto.

In addition, the present invention relates to a composition for freezing a cell or tissue including the above composition.

When cryopreserving cells or tissues, cell membranes may be damaged due to ice recrystallization during melting the cryopreserved cells or tissues for subsequent use, thereby resulting in damaging the cells and tissues due to occurred cell dehydration. Organisms living in a lower-temperature environment may be more easily damaged by ice recrystallization.

The composition of the present invention may be applicable to all cells that are commonly used by freezing for preservation, and may include, for example, prokaryotic cells; eukaryotic cells; microorganisms; animal cells; cancer cells, sperms; eggs; stem cells including adult stem cells, embryonic stem cells, and dedifferentiated stem cells; blood cells including cord blood, white blood cells, red blood cells, and platelets; and tissue cells including kidney cells, liver cells, and muscle cells, but it is not limited thereto.

In addition, the composition of the present invention may be applicable to all tissues that are commonly used by freezing for preservation, and may include, for example all tissues such as cornea, kidney, heart, small intestine, pancreas, lung, liver, and the like without limitation thereof.

Further, the present invention relates to a method for freezing a cell or tissue including exposing a cell or tissue of a subject to a temperature below zero in the presence of the composition.

When freezing the cells or tissues of the subject in the presence of the composition, it is possible to prevent the cells or tissues from being damaged by inhibiting ice recrystallization at the time of subsequent thawing.

Furthermore, the present invention relates to a composition for freezing a food including the above composition, and a method for freezing a food including exposing the food to a temperature below zero in the presence of the composition.

The composition of the present invention may be applied to all frozen foods, and when using the composition, it is possible to minimize a decrease in texture of the food at the time of subsequent thawing.

Hereinafter, the present invention will be described in detail with reference to examples.

Example

1. Simulation

Computer simulation was performed to investigate a difference in ice growth according to the surface shape of particles. Regular hexahedral Au nanoparticles with a concave surface and Au spherical nanoparticles with a convex surface were used as a material (FIG. 1).

As a result, in the regular hexahedral Au nanoparticles with the concave surface, ice did not grow on the surfaces in contact with the concave portion, but a liquid water layer was formed thereon, and the ice was pushed out of the concave portion, thereby exhibiting the effect of antifreezing, but in the Au spherical nanoparticles with the convex surface, there was no effect (FIGS. 2 and 3).

2. Preparation of Au Nanostructures (1) Au Nanocube with Concave Surface (Gold Concave Nanocube (AuCC) in the Drawings)

The material used for manufacturing is as follows:
Sodium borohydride ($NaBH_4$), ≥98.0%;
Gold (III) chloride hydrate ($HAuCl_4$), ≥99.9%;
Cetyltrimethylammonium chloride (CTAC) solution, 25 wt. % in $H_2O$;
Silver nitrate ($AgNO_3$), 99.9999%;
Hydrochloric acid solution (HCl), 1.0 N; and
L-Ascorbic acid, ≥99%.

For manufacturing, 0.60 ml of 10 mM $NaBH_4$ was dissolved in water, and then put in a refrigerator to cool the same. Thereafter, 0.25 ml of 10 mM $HAuCl_4$ and 10.00 ml of 100 mM CTAC were mixed for forming seeds, and then the prepared $NaBH_4$ was rapidly mixed, and stirred for 1 minute, followed by leaving for 2 hours. Then, 0.50 ml of 10 mM $HAuCl_4$, 0.10 ml of 10 mM $AgNO_3$, 0.20 ml of 1.0 M HCl, and 0.10 ml of 100 mM ascorbic acid were mixed to prepare a growth solution.

Thereafter, the prepared seeds were diluted from ×1/10 to ×1/$10^4$ and added to 0.1 ml of the prepared growth solution. After leaving until the reaction is completed, the mixture was washed with a centrifuge (3000 rpm, 10 min) (FIG. 4).

Au nanocubes having various sizes may be made by diluting the concentration of the seeds. Specifically, when applying the growth solution to the seed solution in the same amount as each other, Au ions of the growth solution are adhered to surfaces of the seeds and grow into Au nanocubes. In this case, depending on the number of seeds, for example, as the number thereof is decreased, the number of the gold ions adhered to one seed is increased, and thereby Au nanocubes having a larger size are produced. The Au nanocubes of specifications illustrated in FIG. 5 were manufactured by the above method.

It can confirm that the prepared Au nanocubes had the concave surface (FIG. 6), and the sizes and absorption spectra were as shown in FIGS. 7 to 9.

In addition, AuCC40 (size 40 nm), AuCC70 (size 70 nm), and AuCC170 (size 170 nm) were obtained at concentrations of $4.54 \times 10^{10}$ particles/ml, $1.00 \times 10^{10}$ particles/ml, and $13.79 \times 10^8$ particles/ml, respectively, and particle size distributions thereof were as shown in FIG. 10.

(2) Au Nanocap (Au Cap in the Drawings)

The material used for manufacturing is as follows:
Tetraethyl orthosilicate (TEOS), ≥99.999%;
Ammonium hydroxide solution ($NH_4OH$), about 25% $NH_3$ basis;
Ethanol ($C_2H_5OH$), ≥99.9%;
Clean glass (2.5 cm×2.5 cm);
Gold plate, 5 inch radius; and
Hydrofluoric acid solution (HF), 35%.

6.34 g ethanol and 1.86 g of tetraethyl orthosilicate (TEOS) were mixed and a reaction was executed by dropwise addition of a prepared solution containing 16 g of ethanol and 2.64 g of $NH_4OH$. After 24 hours from the reaction, the mixture was washed with a centrifuge (3000 rpm, 10 min) to prepare silica beads. Thereafter, 0.10 ml of 5 mg/ml silica solution was dropped onto a clean glass substrate (2.5 cm×2.5 cm), followed by drying the same. Then, gold was ionized using a metal ion DC/RF sputtering device and stacked on the substrate in a thickness of 20 nm. Silica particles placed on the substrate were removed through sonication, and the silica particles on an inside were melted by mixing 5% HF solution to leave only the Au nanocap particles on an outside.

Au nanocap particles having a diameter of 500 nm were prepared by the above method, and nanocap particles having a smaller diameter were manufactured by reducing an amount of the TEOS solution (FIG. 5). On the other hand, when increasing the amount of the TEOS solution, Au nanocap particles having a larger diameter may be manufactured.

It can be confirmed that the prepared Au nanocap had a concave surface (FIG. 11), and Au Cap100 (size 100 nm), and Au Cap500 (size 500 nm) were obtained at concentrations of $2.36 \times 10^8$ particles/ml, and $2.60 \times 10^8$ particles/ml, respectively. The particle size distributions thereof were as shown in FIG. 12.

(3) Au Spherical Particles with Convex Surface (without Concave Surface) (Spherical Gold Nanoparticle (AuNS) in the Drawings)

The material used for manufacturing is as follows:
Gold(III) chloride hydrate ($HAuCl_4$), ≥99.9%; and
Sodium citrate tribasic dihydrate, ≥99.0%.

1.0 g of $HAuCl_4$ was dissolved in 50 ml of deionized water. Then, 0.5 g of sodium citrate was dissolved in 5 ml of deionized water. The prepared $HAuCl_4$ solution was heated to 120° C. until boiling. When the solution boiled, the prepared sodium citrate solution was added thereto and a reaction was executed for 10 minutes. The solution after the reaction was cooled to room temperature and then refrigerated by 0.20 um filtering (FIG. 13).

It can be confirmed that the prepared particles are Au spherical particles with a convex surface (FIG. 13).

(4) Surface Modification

The surfaces of the Au nanocubes having sizes of 40, 70 and 100 nm prepared in (1) were modified.

The Au nanocubes were prepared using CTAC, thereby having cetyl trimethylammonium chloride on the surface thereof, and reactions with each of the following compounds were executed to obtain surface-modified Au nanocubes.

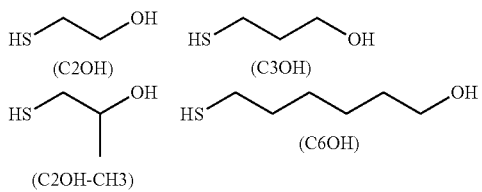

Referring to FIG. 14, since a sulfhydryl group of thiol forms Au—S bond with the Au particles in the reaction, it can be confirmed that the surfaces of the Au nanocubes were modified during the FTIR measurement such that the sulfhydryl peaks disappear.

In addition, it was confirmed that changes in the absorption spectrum occurred while modifying the surfaces due to surface plasmon resonance (SPR) effects on the surfaces of the Au particles, and as the surface area was increased, the occurred change was increased (FIGS. 15 to 17).

3. Confirmation of Insertion into Cell

It was confirmed whether AuCC40 can be inserted into HSC-3 cell.

Specifically, when adding 100 µl of synthesized AuCC40 at a concentration of $4.54 \times 10^9$ particles/ml to a living cell (HSC-3) medium, and then executing a reaction for about 2 hours, nano-sized cube particles are inserted into a cell membrane and finally penetrated into the cell. The inserted Au cube particles can be observed with an optical microscope due to scattering effects.

As a result, it was confirmed that the Au nanocubes were inserted into the cell (FIG. 18).

4. Evaluation for Effect of Antifreezing

The effect of antifreezing was evaluated by observing the effect of inhibiting recrystallization of ice. Ice has very small (several micrometers) domains immediately after rapid cooling, and the size of the domains is increased over time due to recrystallization phenomenon. To quantify this, rapid cooling was performed using liquid nitrogen in a splat method, and then exposed to a temperature of −6° C. for 30 minutes to measure the area of the ice domains. The splat method is a standardized cooling method for observing ice recrystallization inhibition, and ice was formed in a thin film shape by dropping water droplets on a substrate rapidly cooled with liquid nitrogen at a height of 1.5 m in the air.

FIG. 19 is an image showing AuCC40 $7.54 \times 10^{-11}$ M modified with 6-Mercapto-1-hexanol (C6OH), FIG. 20 is an image showing AuCC40 $7.54 \times 10^{-12}$ M modified with 6-Mercapto-1-hexanol (C6OH), FIG. 21 is an image showing AuCC40 $7.54 \times 10^{-12}$ M modified with silver 6-Mercapto-1-hexanol (C6OH), FIG. 22 is an image showing AuCC40 $7.54 \times 10^{-14}$ M modified with 6-Mercapto-1-hexanol (C6OH), FIG. 23 is an image showing AuNS80 $1.66 \times 10^{-11}$ M modified with 6-Mercapto-1-hexanol (C6OH), FIG. 24 is an image showing AuNS80 $1.66 \times 10^{-12}$ M modified with 6-Mercapto-1-hexanol (C6OH), FIG. 25 is an image showing AuNS80 $1.66 \times 10^{-13}$ M modified with 6-Mercapto-1-hexanol (C6OH), and FIG. 26 is an image showing the effect of antifreezing AuNS80 $1.66 \times 10^{-14}$ modified with 6-Mercapto-1-hexanol (C6OH).

Referring to these drawings, it can be confirmed that the materials having the modified hydrophilic functional group exhibit effects of inhibiting the recrystallization of the ice, and the degrees of recrystallization of the ice are different from each other depending on the shape and size of the materials.

In addition, the above results were quantified according to the method illustrated in FIG. 27.

Specifically, ten or more large ice domains were selected, and the areas thereof were calculated using a particle analysis tool of ImageJ program. Among them, an average of the areas of the top ten ice domains with a large area was obtained, and the areas were calculated three or more times for the same sample to use the calculated areas as a final average value. Recrystallization inhibition (RI) values were derived from (average ice area of water containing the material)/(average ice area of pure water) and compared with pure water. If the RI value is close to zero (0), the average ice area is very small, which means that the antifreezing performance is excellent.

The results thereof are shown in FIGS. 28 and 29. Referring to these drawings, AuCC has excellent antifreezing performance due to a very small RI value, whereas AuNS has a much higher RI value than AuCC.

The results of RI quantification of AuCC, surface-modified AuCC, and AuCap are shown in FIGS. 30, 31 and 32, respectively.

Referring to FIG. 30, it can be confirmed that, as the amount of the added gold seeds during manufacturing is decreased, the larger particles are made, and thereby, it is difficult to obtain particles with a high concentration when the size of the particles is increased, but all the particles of each size exhibit the effect of antifreezing.

Referring to FIG. 31, it can be confirmed that the best effect of antifreezing is obtained when the surface is not modified (CTAC) as well as when the surface is modified with C6OH.

Referring to FIG. 32, AuCap exhibits an RI value similar to water. It is determined that AuCap is manufactured on the substrate by a stuffing method, such that the concentration is lower than the method of synthesizing particles in a solution, and thereby the concentration is not sufficient to exhibit an excellent RI value.

What is claimed is:

1. A method for freezing a cell or tissue, the method comprising exposing a cell or tissue of a subject to a temperature below zero in the presence of a cryopreservation composition comprising a cryoprotective agent consisting of a gold (Au) nano structure in which at least a portion thereof is concave, wherein the gold (Au) nanostructure has a concave surface such that a liquid water layer is formed thereon and ice does not grow on the concave surface during the exposing the cell or tissue of the subject to the temperature below zero in the presence of the cryopreservation composition, and wherein the gold (Au) nanostructure has a shape of tetrahedron, hexahedron, octahedron, decahedron, dodecahedron, icosahedron, tetrakis hexahedron, hexakis octahedron, rhombic dodecahedron, cylinder, saddle or cap.

2. The method according to claim 1, wherein the gold (Au) nanostructure has the shape of tetrahedron, hexahedron, octahedron, decahedron, dodecahedron, icosahedron, tetrakis hexahedron or hexakis octahedron.

3. The method according to claim 1, wherein the gold (Au) nanostructure has a size of 10 nm to 1000 nm.

4. The method according to claim 1, wherein the concave surface has an absolute value of a surface curvature of $0.1 \times 10^{-2}$ $nm^{-1}$ to $5 \times 10^{-2}$ $nm^{-1}$.

5. The method according to claim 1, wherein the gold (Au) nanostructure has increased hydrophilicity by modifying a surface thereof.

6. The method of claim 1, wherein the gold (Au) nanostructure has the shape of tetrahedron.

7. The method of claim 1, wherein the gold (Au) nanostructure has the shape of hexahedron.

8. The method of claim 1, wherein the gold (Au) nanostructure has the shape of octahedron.

9. The method of claim 1, wherein the gold (Au) nanostructure has the shape of decahedron.

10. The method of claim 1, wherein the gold (Au) nanostructure has the shape of dodecahedron.

11. The method of claim 1, wherein the gold (Au) nanostructure has the shape of icosahedron.

12. The method of claim 1, wherein the gold (Au) nanostructure has the shape of tetrakis hexahedron.

13. The method of claim 1, wherein the gold (Au) nanostructure has the shape of hexakis octahedron.

14. The method of claim 1, wherein the gold (Au) nanostructure has the shape of rhombic dodecahedron.

15. The method of claim 1, wherein the gold (Au) nanostructure has the shape of cylinder.

16. The method of claim 1, wherein the gold (Au) nanostructure has the shape of cap.

17. A method for freezing a cell or tissue, the method comprising exposing a cell or tissue of a subject to a temperature below zero in the presence of a cryopreservation composition comprising a cryoprotective agent consisting of a gold (Au) nanostructure in which at least a portion thereof is concave, a surface of the gold (Au) nanostructure being modified to have a functional group, wherein the gold (Au) nanostructure has a concave surface such that a liquid water layer is formed thereon and ice does not grow on the concave surface during the exposing the cell or tissue of the subject to the temperature below zero in the presence of the cryopreservation composition, and wherein the gold (Au) nanostructure has a shape of tetrahedron, hexahedron, octahedron, decahedron, dodecahedron, icosahedron, tetrakis hexahedron, hexakis octahedron, rhombic dodecahedron, cylinder or cap.

\* \* \* \* \*